United States Patent [19]
Nichani

[11] Patent Number: 5,970,166
[45] Date of Patent: *Oct. 19, 1999

[54] SYSTEM OR METHOD FOR IDENTIFYING CONTENTS OF A SEMI-OPAQUE ENVELOPE

[75] Inventor: Sanjay Nichani, Newton, Mass.

[73] Assignee: Cognex Corporation, Natick, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/716,779

[22] Filed: Sep. 24, 1996

[51] Int. Cl.⁶ .................................................. G06K 9/00
[52] U.S. Cl. ........................................... 382/141; 382/224
[58] Field of Search ..................... 382/100, 101, 382/141, 143, 224, 270, 274, 130

[56] References Cited

U.S. PATENT DOCUMENTS

| | | | |
|---|---|---|---|
| 4,731,863 | 3/1988 | Sezan et al. | 382/51 |
| 4,876,457 | 10/1989 | Bose | 250/563 |
| 5,054,100 | 10/1991 | Tai | 382/47 |
| 5,153,925 | 10/1992 | Tanioka et al. | 382/52 |
| 5,212,740 | 5/1993 | Paek et al. | 382/22 |
| 5,311,598 | 5/1994 | Bose et al. | 382/8 |
| 5,325,443 | 6/1994 | Beatty et al. | 382/8 |
| 5,371,690 | 12/1994 | Engel et al. | 382/141 |
| 5,436,979 | 7/1995 | Gray et al. | 382/141 |
| 5,481,620 | 1/1996 | Vaidyanathan | 382/169 |
| 5,495,535 | 2/1996 | Smilansky et al. | 382/145 |

OTHER PUBLICATIONS

Automated Vision System for Inspection of IC Pads and Bonds, Sreenivasan et al., *IEEE Transactions on Components, Hybrids, and Manufacturing Technology*, pp. 335–338, vol. 16, No. 3, May 1993.

Discrimination of Planar Shapes Using Shape Matrices, Taza et al. *IEEE Transactions on Systems, Man, and Cybernetics*, pp. 1281–1289, vol. 19, No. 5., Oct. 1989.

Subpixel Image Registration Using Circular Fiducials, Efrat et al., *IEEE*, pp. 49–58, 1993.

*Primary Examiner*—Phuoc Tran
*Attorney, Agent, or Firm*—Anthony L. Miele; Russ Weinzimmer

[57] ABSTRACT

A method and system detect for the presence of an object of unknown shape, configuration, orientation and location within a non-rigid semi-opaque enclosure. The semi-opaque enclosure has a pattern which is visible on at least a first of its external surfaces. The semi-opaque enclosure may comprise, for example, a photo-envelope containing a film package, and the visible pattern may be print and graphical information provided on the envelope's outer surface. A first digital image (containing just the front print) is captured from first channel light reflected off the first external surface of the enclosure; and a second digital image (containing the front print and a silhouette of the object) is captured from second channel light navigating the object inside the enclosure and emanating from the first external surface of the enclosure. A difference image is formed substantially devoid of information representing the visible pattern on the first external surface, by subtracting one of the first and second digital images from the other. Additional segmentation processing may be performed on the difference image in order to better identify the presence of a defect or non-conforming object within the semi-opaque enclosure.

25 Claims, 10 Drawing Sheets

SYSTEM OR METHOD FOR IDENTIFYING CONTENTS OF A SEMI-OPAQUE ENVELOPE

BACKGROUND OF THE INVENTION

1. Related Application Data

The present disclosure is related to the following copending, commonly assigned U.S. patent applications:

U.S. patent application Ser. No. 08/621,189, entitled "Machine Vision Methods for Inspection of Leads on Semiconductor Die Packages," filed in the name of Sanjay Nichani on Mar. 21, 1996 (Attorney Docket No. 150448-031);

U.S. patent application Ser. No. 08/621,190, entitled "Machine Vision Methods for Inspection of Semiconductor Die Surfaces," filed in the name of Sanjay Nichani on Mar. 21, 1996 (Attorney Docket No. 150448-032);

U.S. patent application Ser. No. 08/621,137, entitled "Machine Vision Methods for Image Segmentation Using Multiple Images," filed in the name of Sanjay Nichani on Mar. 21, 1996 (Attorney Docket No. 150448-030); and U.S. patent application Ser. No. 08/718,674, entitled "System or Method for Detecting Defect Within a Semi-Opaque Enclosure," filed in the name of Sanjay Nichani on even date herewith (Attorney Docket No. 221757).

Each of the above-listed copending, commonly-assigned U.S. patent applications is hereby incorporated herein by reference in its entirety.

2. Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

3. Field of the Invention

The present invention relates to a machine vision system or method for detecting at least one object within a semi-opaque enclosure. More particularly, the present invention relates to such a system or method which obtains or enhances an object image while eliminating or diminishing a background image which accompanies the object image.

4. Description of Background Information

Computer vision, otherwise referred to as image processing, involves the extraction of vision-related information by obtaining signals representing a scene and performing image signal processing on those signals. Applications of computer vision (image processing) techniques include character recognition, industrial inspection of manufactured items, robot guidance systems, radiology, remote sensing, and so on.

Image processing methods may typically comprise several common processing steps, e.g., as described by Rafael C. Gonzalez and Paul White in a book entitled "Digital Image Processing," Addison-Wesley (1992), the content of which is hereby incorporated herein by reference in its entirety.

In a first step, image acquisition is performed to acquire an image of the scene to be analyzed. The image may, for example, be represented in the form of a monochrome or simple digital image f(x,y) discretized both in spatial coordinates x,y and in brightness (gray levels) f.

Pre-processing and enhancement techniques may then be performed on the digital image in order to improve the image and increase the chances for success in subsequent processes. Such pre-processing and image enhancement techniques may include enhancing the contrast between one or more object images and a background image, and filtering noise from the image.

Segmentation may then be performed, which involves distinguishing between different types of regions within the input image, e.g., distinguishing between an object image and a background image.

In a next step, representation and description processing may be performed. In performing representation processing, the data obtained as a result of segmentation is converted into a "representation" suitable for computer processing. In performing description processing, "feature descriptions" are extracted from the representation. Such "feature descriptions" may categorize objects to allow one class of object to be differentiated from another.

In a final stage of the image processing, recognition and interpretation processes are performed. Recognition processing may include assigning a label to an object based upon information provided by its "feature descriptions." Interpretation processing may assign a meaning to an arrangement of recognized objects. For example, several characters may be "interpreted" as forming a particular word.

Golden Template Comparison (GTC) is an image processing method that has been used to detect flaws and defects in two-dimensional scenes of an inspected item which are highly repeatable and do not suffer from geometric distortion. Such scenes are common in semiconductor production and graphic arts applications. Generally, GTC involves the comparison of a test image to an image of a known good scene referred to as a template image. More specifically, the test image is subtracted from the template image, and differences between the two images are observed in order to determine whether a flaw or defect is present within the inspected item.

Generally, GTC comprises two main phases: training and inspection. During training, the template image is constructed by sampling a plurality of images each of which represents a scene of an item absent defects. During inspection, the test image, which represents the scene of the item to be tested (the inspected item), is then compared to the template image. More specifically, the images are subtracted to form a difference image. Thresholding is performed on the difference image to produce a resulting binary image called an error image containing either background (healthy) pixels or defect pixels which represent flaws. The error image is then analyzed in order to determine whether the tested item should be labeled as an "accept" or "fail" item. The analysis that may be performed on the error image may include counting defect pixels found in the error image and performing a blob analysis on the defect pixels. The results of the analysis may be stored in a data structure called a results structure.

In various commercial settings, service providers receive from their customers items enclosed in semi-opaque envelopes, and process the enclosed items in some manner. The service provider regularly receives large numbers of such envelopes. The types of items in the envelopes vary, and the processing steps performed on the items change in accordance with the item type. Thus, the service provider separates the envelopes according to item type. To achieve this, the service provider may use an automated content identifying system to identify or classify the enclosed items.

Photograph developers receive large numbers of paper envelopes containing different types of film (e.g., "126", "110", 35 mm, and disk cartridge type films), and process (develop) each film type using a unique set of processing steps. Thus, before processing, the photograph developer separates the envelopes into groups according to the envelope's contents.

In order to identify the contents of the envelopes, a form is provided on the outside of each paper envelope which can be filled out by the customer. The form may include boxed which can be checked to categorize the contents of the envelope, for example, to indicate that the type of film in the envelope is 35 mm, 110, or a disc type film. A character recognition system or another type of image processing system may be provided to automatically ascertain the information indicated on the outside of the envelope in order to categorize the envelopes in accordance with their contents.

In other commercial settings, goods are placed in semi-opaque enclosures, for example, envelope(s) or cardboard box(es), temporarily stored and sent to a desired destination. The contents of these enclosures may be identified by placing certain characters or another type of external identifier, such as a bar code, on the outside of the enclosure. In order to quickly determine the contents of such an enclosure, a character recognition, bar code or other type of reading system may be utilized. Such systems can be problematic if an error occurs in packaging, and an enclosure contains an item different than the item identified with the enclosure's external identifier. In commercial photo-film processing settings, check-marks are put in boxes by consumers to identify the contents of the envelope. The check-mark identification may be erroneous, as the consumer may carelessly make the mark or not even provide a mark.

Accordingly, there is a significant need for a system which can quickly and automatically identify and verify the content of a semi-opaque enclosure.

5. Definitions Of Terms

The following term definitions are provided to assist in conveying an understanding of the various exemplary embodiments and features disclosed herein.

Back Lighting

Lighting produced by a light source (or emanating from a channel) directed toward an image acquisition device such as a camera, and located behind the object of interest. Back lighting causes the image acquisition device to receive a silhouette of the object of interest.

Channel

A location from which light is emanating. A channel may be a light source or it may be an optical element redirecting light from another light source. Such an optical element may include, for example, a beam splitter, or a split mirror.

Front lighting

Lighting produced by a light source (or emanating from a channel) directed toward an object of interest and generally on the same side of the object of interest as the image acquisition device.

Segmentation

A process of distinguishing between different types of regions within an image. Object/background discrimination is a particular type of segmentation which includes identifying those portions within an image corresponding to an object and those portions within the image corresponding to the background. Defect and flaw detection is a type of object/background discrimination.

Training

A process (commonly used in Golden Template Comparison flaw and defect detection methods) of obtaining a plurality (usually several) sample images of flawless items to generate both a template image and statistical information pertaining to the template image.

SUMMARY OF THE INVENTION

The present invention is provided to improve upon image processing systems and methods for detecting an object within a malleable semi-opaque enclosure such as an envelope. A semi-opaque enclosure is one which is not completely transparent. While objects within the enclosure cannot be seen with the naked eye, light can pass through the enclosure. In order to achieve this end, one or more aspects of the invention may be followed in order to bring about one or more specific objects and advantages, such as those noted below. One object of the present invention is to provide an improved method for acquiring images and representing those images. The improved method obtains an image accurately representing the object, without distortion, and increases the contrast of the object with respect to a background image accompanying the object image.

Another object of the present invention is to provide an improved segmentation method which can detect a defect (or another object of interest) of unknown shape, configuration, and location from within a semi-opaque enclosure of varying shape and configuration, such as a labeled bottle.

A further object of the present invention is to improve the speed of and to automate the identification and categorization of packages such as envelopes in commercial settings. For example, such a need may occur when categorizing photo-envelopes according to their contents (for example, the type of film) for subsequent processing (developing the film).

The present invention, therefore, is directed to a method or system for detecting the presence, classifying non-conforming object (at least one) of unknown shape, orientation, configuration, and location within a semi-opaque enclosure. The semi-opaque enclosure may comprise a semi-opaque envelope, package or box. The enclosure is non-rigid making the problem more complex as there is no repeatability of the process.

The semi-opaque enclosure has at least first and second external surfaces, where the first external surface has a pattern visible externally to the enclosure (e.g., print and graphical information, a logo, or a bar code) provided on an outside surface of a package identifying the package's contents.

A first digital image is captured from first channel light reflected off the first external surface of the semi-opaque enclosure. More specifically, the first digital image may be a reflected-light image formed with front lighting impinging on a front side of the rigid semi-opaque enclosure. A second digital image is captured from second channel light navigating the object inside the enclosure and emanating from the first external surface of the enclosure. More specifically, the second digital image may be a transmitted-light image formed with back lighting, which is directed onto a back side of the semi-opaque enclosure and thus forms a silhouette image of the object inside the enclosure. The silhouette image emanates from the first external surface (e.g., the front side) of the enclosure. A difference image is formed substantially devoid of information representing the visible pattern on the first external surface, by subtracting one of the first and second digital images from the other. the resulting representation of the object is then processed to identify the type of object contained within the enclosure.

BRIEF DESCRIPTION OF THE DRAWINGS

The above and other objects, features and advantages of the present invention are further described in the detailed description which follows, with reference to the drawings by way of non-limiting exemplary embodiments of the present invention, wherein like reference numerals represent similar parts of the present invention throughout the several views, and wherein.

DETAILED DESCRIPTION OF THE EXEMPLARY EMBODIMENTS

The present invention is directed to a system or method for using electromagnetic radiation, more specifically—light (e.g., visible light having a wavelength between 400 nm–760 nm), in a particular manner to separate out different aspects of an image, causing an object (at least one) to stand out in relation to the background within the image. The object may be located within a semi-opaque enclosure. Two separate images are formed using at least two separate light channels. One of the light channels emphasizes the object in relation to a background image, while the other light channel either de-emphasizes the object and causes the background image to remain the same. The background image is present in both the first and second separate images. Thus, one image may be subtracted from the other, causing the background image to be subtracted out and the object image to remain.

This may be achieved, in certain commercial or industrial applications, using grazing light and on-axis light, for example, as disclosed in the above-identified U.S. Patent Application entitled "Machine Vision Methods for Image Segmentation Using Multiple Images," (Attorney Docket No. 150448-030). An alternate method may be used to detect (and, if desired, also identify or categorize) objects located within a semi-opaque enclosure, such as a labeled bottle or a paper envelope. A first digital image may be captured from first channel light (front lighting) reflected off a front external surface of the semi-opaque enclosure; and a second digital image may be captured from second channel light (back-lighting) which navigates the object inside the enclosure and emanates from the front external surface of the enclosure.

A difference image may then be formed which is substantially devoid of information representing the visible pattern provided on the front external surface of the enclosure, by subtracting one of the first and second digital images from the other. This occurs since both the first digital image (i.e., the reflected-light image) and the second digital image (i.e., the transmitted-light image) each contain the background image, while only the second digital image (the transmitted-light image) contains the object to be detected. Thus, when one of the images is subtracted from the other, the background information is subtracted out, leaving only an image representing the object.

The resulting image may comprise a two-dimensional gray level image. That two-dimensional gray level image may be resegmented by using a dynamic/local threshold image to form a two-dimensional binary image from the difference image. The resulting two-dimensional binary image may then be processed to classify the object located within the enclosure. Such classification processing may include classification techniques such as Search and/or Blob processing techniques which will be further described below.

Figure 1:
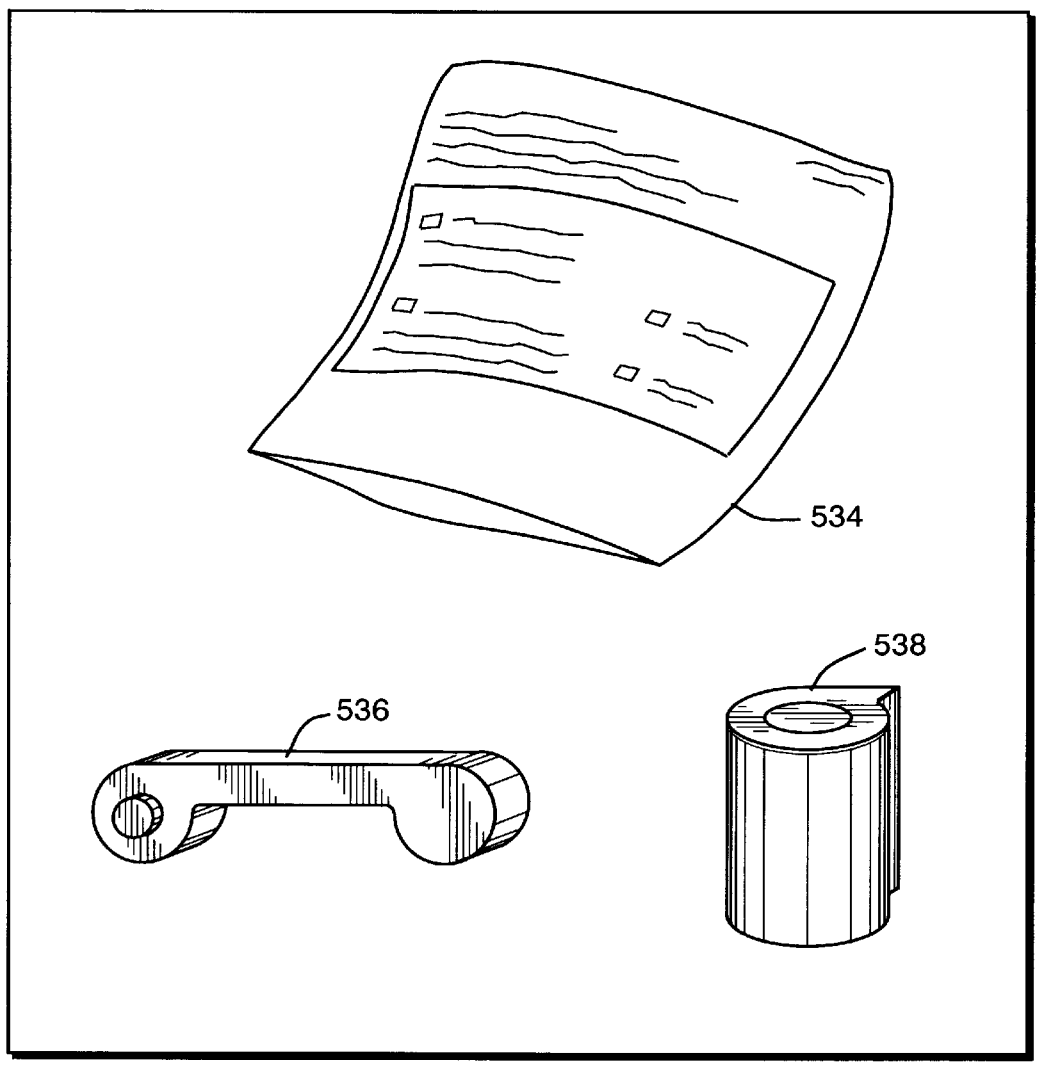
FIG. 1 comprises respective views of an envelope, and two different types of film packages.

The non-rigid semi-opaque enclosure may comprise an envelope containing items to be processed (for example, film to be processed by a film processing center) or items to be provided to consumers (for example, machining or automobile parts to be used by machinists or mechanics in the assembly or repair of machines). The illustrated embodiment forms part of an inbound film processing system (not shown) where envelopes containing different types of film and other camera-related products will be processed by a film processing center. FIG. 1 provides several perspective views of an envelope 534 and first and second types of film types 536 and 538.

Figure 2B:
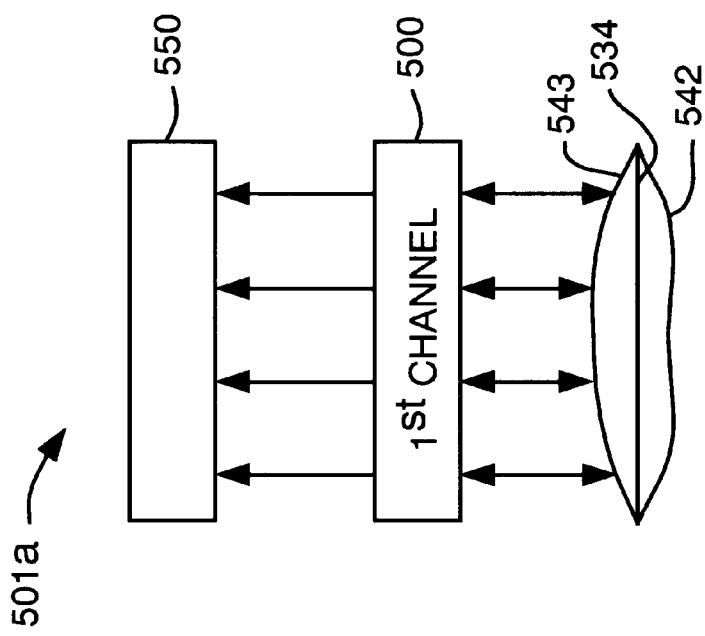
FIGS. 2A–2B respectively illustrate a transmitted-light subsystem and a reflected-light subsystem both of which may be provided in accordance with one embodiment of the present invention.
Figure 2A:
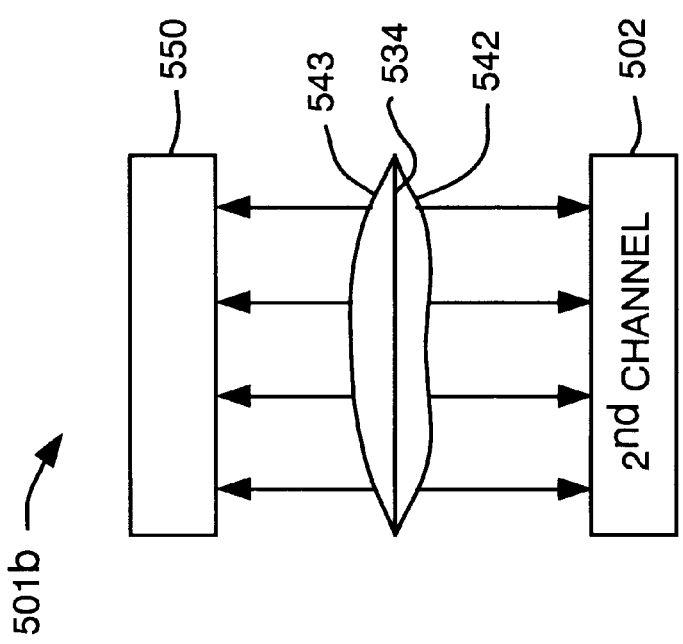

FIG. 2B illustrates a reflected-light subsystem (a first image acquisition subsystem) 501*a* and FIG. 2A illustrates a transmitted-light subsystem (a second image acquisition subsystem) 501*b*. In FIG. 2B, light originates from a first channel source 500, and is reflected off a front surface 543 of an envelope 534. The reflected light then impinges upon an image plane provided within image acquisition device 550. In FIG. 2A, a second channel source 502 produces second light, significantly brighter than the first light produced by first channel source 500. The second light is directed onto a back surface 542 of envelope 534. The second light produced by second channel source 502 comprises back lighting, while the first light produced by first channel light source 500 comprises front lighting. In the illustrated embodiment, the back lighting is significantly brighter than the front lighting, since a significant amount of back lighting (the second light) will be lost as it is transmitted through envelope 534 before it exits front surface 542 of envelope 534 and impinges upon the image plane provided within image acquisition device 550.

Referring to the transmitted-light subsystem 501*b*, the second light impinging upon the image plane of image acquisition device 550 includes print information derived from front surface 543 of envelope 534, but does not include print information and other visible features which may be on back surface 542 of envelope 534. This is because the light that impinges on back surface 542 is deflected and disbursed within the inside of envelope 534, and therefore, never arrives at the image plane of image acquisition device 550.

Referring to reflected-light subsystem 501a as shown in FIG. 2B, the first light originates from first channel source 500 and impinges upon a front surface 543 of envelope 534. The light is reflected directly back toward an image plane provided within image acquisition device 550. The resulting reflected-light image also contains the print which is on front surface 543 of envelope 534, as does the transmitted-light image. That print will form part of the background information which will be subtract out.

Figure 3:
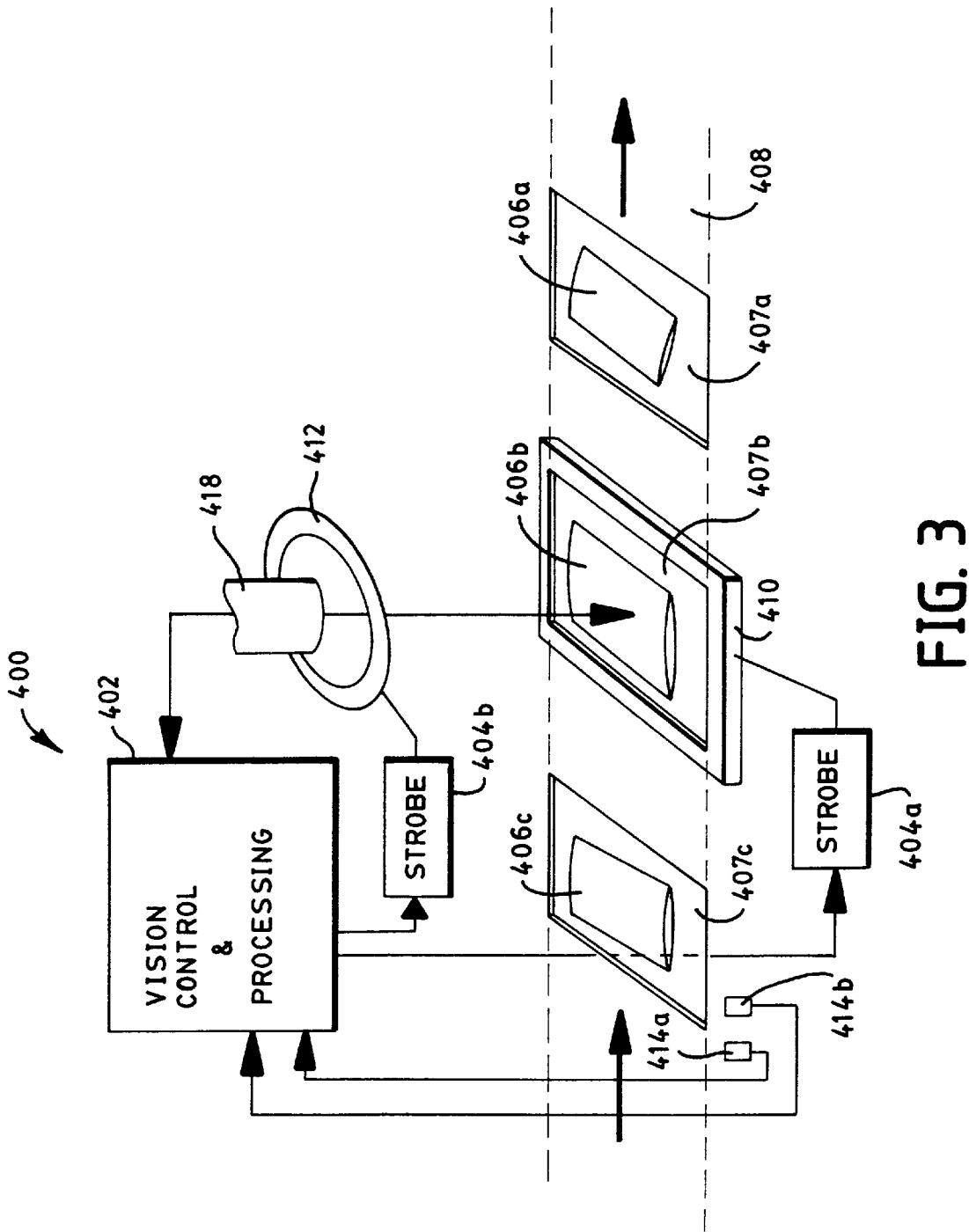
FIG. 3 is a perspective view of an illustrative embodiment of a visual envelope content identification system which may be provided in connection with the present invention.

FIG. 3 is a perspective view of a visual envelope content identification system 400. The illustrated system 400 comprises a vision control and processing computer system 402, and a plurality of items to be analyzed which include a plurality of envelopes 406a–406c and others (not shown). Envelopes 406a–406c are supported by respective transparent support trays 407a–407c which are supported by a moving conveyor 408. The illustrated system 300 further comprises various image acquisition components. Image acquisition components include a front light 412 which is positioned in alignment with a horizontal plane which is parallel to the direction of movement of conveyor 408.

A back light 410 is positioned in alignment with a horizontal plane which is also parallel to the direction of movement (and the supporting upper surface) of conveyor 408. Front light 412 is positioned over (on top of) and at a horizontal position corresponding to an envelope 406b to be analyzed. Back light 410 is also positioned at the same general position and vertically aligned with the same envelope 406b to be analyzed. Accordingly, envelope 406b is positioned directly between front light 412 and back light 410.

The image acquisition components may further comprise a camera 418, a plurality of strobes 404a–404b, and one or more position sensors 414a, 414b.

As envelopes 406x (including the three illustrated 406a–406c) move along conveyor 408, transmitted-light and reflected-light images are obtained of each individual analyzed envelope, each time an envelope is moved into a position directly between front light 412 and back light 410.

As each envelope 406x enters the range of the image acquisition system, including front light 412, back light 410 and camera 418, a total reflected-light image (first digital image) is obtained which includes an image of the entire profile of the envelope. Similarly, the transmitted-light image (second digital image) includes the complete profile of the entire envelope. A conventional image processing technique may be performed to ascertain other information concerning the envelope, including reading of information on the outside of the envelope such as bar code information or other written information concerning the contents of the envelope. This typically done on the front image as it gives the front print exclusively. This has been previously done manually.

In order to determine the shape and location of objects located behind a semi-opaque surfaces of the envelope, the pertinent portions of the envelope are obtained before subsequent processing is performed.

Sensors 414a, 414b are utilized to generate signals when the position of an envelope corresponds to each sensor 414a and 414b. Vision control and processing computer system 402 determines when a certain amount of time passes from the point at which envelope 406c passes each sensor 414a, 414b, in order to determine when the envelope is in correct alignment with the image acquisition system and when to trigger the taking of front reflected-light (first digital) image and back transmitted-light (second digital) image. Accordingly, vision control and processing computer system 402 and sensors 414a, 414b facilitate registration of each envelope with the image acquisition system.

The system illustrated in FIG. 3 may be modified and still facilitate accurate identification of the contents of envelopes (or other types of semi-transparent malleable enclosures). For example, one or more cameras may be provided to capture the first (reflected-light) image and the second (transmitted-light) image. In addition, the envelope may be moved in a different manner in order to bring the same in alignment with the camera or cameras and the front and back lights.

Strobes 404a and 404b are provided to freeze the motion in the obtained images. They are controlled to correspond in time with the taking of the images by camera 418. This is done in order to prevent blurring in the resulting captured images. Movement of an envelope by an amount equivalent to one-half pixel or more can significantly blur the captured image. When a system is used to automatically categorize envelopes being received by a film development center, it may be desired to move the envelopes at high speeds such as on the order of two envelopes per minute, or significantly faster. With such speeds, reasonable steps should be taken to prevent blurring of the captured images used for identifying the envelope contents. An additional, or alternate, measure that can be taken to reduce or eliminate blur is the use of a shutter camera, which will localize (in time) the visual information which is used to capture each image.

Sensors 414a, 414b may each comprise a transitive or a reflective light-based sensor or another type of sensor (transducer) which can generate a signal accurately indicating the physical presence and position of an envelope, such a signal being forwarded to vision control and processing computer system 402. Alternatively, one sensor may be provided.

In accordance with a specific implementation of the system illustrated in FIG. 3, the two sensors may be separated by a certain distance so that an amount of time that it takes for an envelope to move from first sensor 414a to second sensor 414b is 51 ms. This facilitates the capturing of two images in succession. Such a distance may, e.g., be approximately 0.6 inches. First sensor 414a will then generated a first trigger signal to activate front light 412, while second sensor 414b generates a second trigger signal to activate back light 410. Accordingly, after a certain amount of time from the generating of each of the first and second signals, each input to vision control and processing computer system 402, vision control and processing computer system 402 can then control the triggering of front light 412 (after a certain amount of time has elapsed since the first signal was input) and of back light 410 (after a certain amount of time has elapsed since the second signal was input).

The system can be calibrated in order to determine the number of image pixels which correspond to the distance between first and second sensors 414a and 414b. For example, this may be done by placing a calibration sheet with a vertical bar (a line perpendicular to the direction of movement of conveyor 408) on a tray 407b. Front lit and back lit images may then be obtained, and horizontal calipers may be used in the front and back lit images to calculate the difference in the position of the vertical bar in the two images. The offset in the direction of motion (which corresponds to the direction of movement of conveyor 408) can then be determined. In other words, the line provided in the test sheet can be located in the first and second images with the use of edge finding tools (e.g., caliper tools, such as provided by COGNEX) to calculate the position change (in image pixels) of the vertical bar between the two images. Once the offset is obtained between the two images, it is used during run-time to register the from and back images with each other.

Different types of light sources, e.g., diffused and/or parallel beam light sources, may be used to produce either or both the front lighting and the back lighting. In the embodiment illustrated in the FIG. 3, front light 412 comprises a ring light which may be a commercially available FOSTEC brand 5 inch ring light. In the alternative, another type of diffused light or collimated light can be used to produce the front lighting for the system in FIG. 3. A beam splitter or a split mirror may be used so that the front lighting does not interfere with the optical axis of camera 418.

In the embodiment illustrated in FIG. 3, back light 410 may, for example, comprise a commercially available FOSTEC brand back light. Similarly, the back light may be implemented with other types of light sources, including a diffused light and/or collimated light. Multiple line lights can be used to form the back lighting. Multiple point lights and/or multiple bundles may be used to form the back lighting as well.

The folds and flaps which are formed near or at the edges of an envelope may cause shadows within a second digital image (a transmitted-light image) using back light 410. This is because the number of layers of paper (or another appropriate envelope material) is greater at these locations, and because the paper near the edge may be more tightly sandwiched, i.e., the distance between the front and back sheets forming the envelope may be smaller. This may further complicate the ability to segment the resulting difference image, obtained by subtracting one of the acquired digital images from the other. However, this problem can be alleviated by using a non-uniform back light, with a higher intensity light applied at the edges of the envelope at locations corresponding to the folds and flaps of the envelope. In this regard, the back light may be formed by an assembly of several point and line light sources directed at the back surface of each envelope 406x in order to provide a desired non-uniform illumination pattern.

Figure 4:
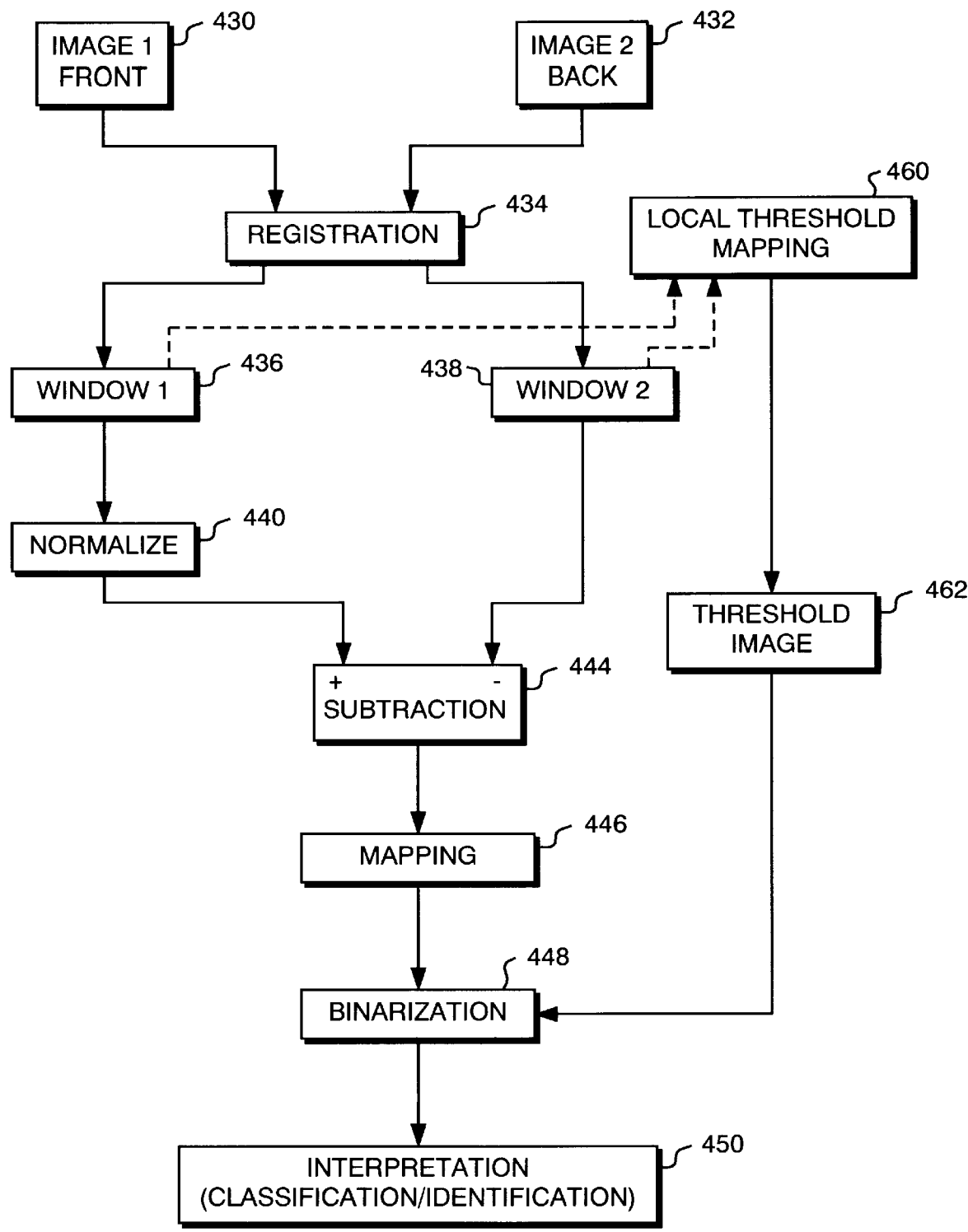
FIG. 4 is a flow chart illustrating a visual content identification process which may be performed in connection with the content identification system shown in FIG. 3.

FIG. 4 is a flow chart of the image processing which may be performed in connection with the visual inspection system illustrated in FIG. 3. A first digital image 430 and a second digital image 432 are each obtained. A registration mechanism 434 is provided to digitally register first digital image 430 with second digital image 432. Registration mechanism 434 may perform such digital registration in accordance with a method utilizing two-dimensional cross-correlation of images as is disclosed by Jain in Chapter 2 of a book entitled "Fundamentals of Digital Image Processing," Prentice Hall (1989). Chapter 2 of that book is hereby incorporated herein by reference in its entirety. Additional or alternative digital registration techniques may be used at this point of image processing as well.

The registered images correspond to the same portions of first and second digital images 430 and 432, for subsequent processing. When inspecting a labeled bottle, as illustrated in FIG. 3, the portion of the image obtained by the first and second windows 436 and 438 corresponds to the portion of an envelope corresponding to the position of its contents. After windowing the first and second digital images with first and second windows 436 and 438, the resulting gray-level windowed first digital image may be normalized by first normalization mechanism 440.

Normalization may be performed on one or both of the first and second digital images output by first and second windows 436 and 438. In the illustrated embodiment, normalization is performed on the first test image to compensate for image variations due to normal changes or differences in lighting and aperture. Normalization is performed in Golden Template Comparison for similar reasons in order to compensate for normal changes in lighting between a test image verses a template image.

Normalization may be performed by pixel mapping in order to transform gray-scale values to another set of values. Such a pixel map may be derived using statistics based upon one or both of the windowed first and second digital images. More specifically, by way of example, a pixel map may be derived based upon one or both of the windowed images, from histogram equalization, mean and standard deviation, tail matching, or identity transformation. With histogram equalization, a pixel map is derived from a histogram of a digital image. Using the mean and standard deviation, such a pixel map may be derived using the mean and standard deviation calculated from a digital image. In tail matching, mapping is performed in accordance with left and right tails, which are outlying points (representing gray-scale values) on the left and right ends of a histogram, beyond which gray-scale values are considered unreliable. The gray-scale values lying outside of these tails are discarded before mapping is performed. In order to normalize the first windowed digital image with respect to the second windowed digital image, the range of gray-scale values between the tails of one of the image's histogram may be linearly mapped to correspond to the range between the tails of the histogram of the other of the two images. With identity transformation, each gray-scale value of the image is mapped to itself; i.e., there is no change in the image.

Once normalization (if necessary) is performed, the windowed second digital image is subtracted from the windowed first digital image with the use of a subtraction mechanism 444. The result of subtraction produces a difference image $d(x,y)$. The difference image $d(x,y)$ is then mapped with the use of a mapping mechanism 446. At this stage of the processing, mapping may comprise linear mapping of the various pixel values within difference image $d(x,y)$ to remove any negative pixel values present in the difference image as a result of the subtraction.

The processing performed by normalization mechanism 440, subtraction mechanism 444, and mapping mechanism 446 comprise image enhancement techniques. Subtraction mechanism 444 performs a preliminary stage segmentation, facilitating object/background discrimination based upon windowed first and second digital images $f_1(x,y)$ and $f_2(x,y)$.

Subsequent to the image enhancement techniques, a subsequent-stage segmentation is performed by binarization mechanism 448. More specifically, the mapped normalized gray-level difference image output by mapping mechanism 446 is resegmented (binarized). This binarization is performed in accordance with a threshold image 462, which may be defined by a local threshold mapping mechanism 460 produced in accordance with a local threshold mapping.

Upon receipt of a binarized error image output by binarization mechanism 448, an interpretation mechanism 450 analyzes the various object pixels in relation to background pixels in order to classify/identify the item corresponding to those pixels.

Local threshold mapping is performed by local threshold mapping mechanism 460 together with a threshold image 462. Local threshold mapping mechanism 460 is used to produce a local threshold image 462. That local threshold image 462 may then be used to control a binarization mechanism 448. Binarization mechanism 448 may then apply different threshold values to the respective corresponding pixels of gray-level difference image output by mapping mechanism 446, in order to obtain a segmented binary image that accurately separates the objects from background.

In the illustrated embodiment, threshold image 462 is formed as a function of second digital image (transmitted-light image) 432. In the alternative, it may be formed as a function of first digital image (reflected-light image) 430, or as a function of both first and second digital images 430, 432. Local threshold image 462 contains a number of pixels corresponding to each of the pixels of the difference image, and each pixel value of local threshold image 462 is set to a value chosen to prevent binarization mechanism 448 from (1) disrupting or disjointing regions within the objects being detected, and (2) including shadows or other noise in the resulting segmented binary image.

First and second digital images 430 and 432, respectively, may comprise two-dimensional gray-level images represented with respective two-dimensional light intensity functions $f_1(x,y)$ and $f_2(x,y)$ wherein x and y denote spatial coordinates and $f_1$ and $f_2$ are values proportional to the brightness (gray-level) of the respective image at a point x,y.

Preferably, the local threshold mapping mechanism utilizes a threshold function which uses different threshold values for different pixels within difference image $d(x,y)$. Let $p(x,y)$ be a threshold image. The resulting two-dimensional binary thresholded image $g(x,y)$ may be defined as being equal to "1" if $d(x,y)$ is greater than $p(x,y)$, and "0" if $d(x,y)$ is less than or equal to $p(x,y)$. The parameters x and y represent spatial coordinates of a pixel (x,y) of the difference image $d(x,y)$ is the gray-level of the pixel (x,y) and $p(x,y)$ is a local threshold control variable corresponding to the pixel (x,y).

$p(x,y)$ may represent a gray-level local threshold image defined as a function of at least one of the first and second digital images $f_1(x,y)$ and $f_2(x,y)$. $p(x,y)$ may be obtained by performing a local threshold mapping operation on the second digital image $f_2(x,y)$. The local threshold mapping operation comprise performing point processing in the spatial domain on the second digital image $f_2(x,y)$ in accordance with r=dmap(s), for a pixel having spatial coordinates (x,y), where dmap is a mapping function, r is a gray-level equal to $p(x,y)$ and s is a gray-level equal to $f_2(x,y)$.

The function r(s) may be defined in accordance with its slope. More specifically, the slope of r(s) may be defined to continuously increase as the value of s increases. In the specific embodiment illustrated herein, r is defined as follows:

$r=s^2 t/1000$, where t is a threshold coefficient which may be determined empirically.

Referring again to FIG. 4, once local threshold image 462 is obtained, binarization mechanism 448 subtracts local threshold image 462 from the difference image output by mapping mechanism 446. Binarization mechanism 448 then binarizes the result using a map, such that pixels with positive difference values are replaced with a defect pixel (e.g., a "1") and pixels with a negative difference value are replaced with a background pixel (e.g., a "0").

Figure 5:
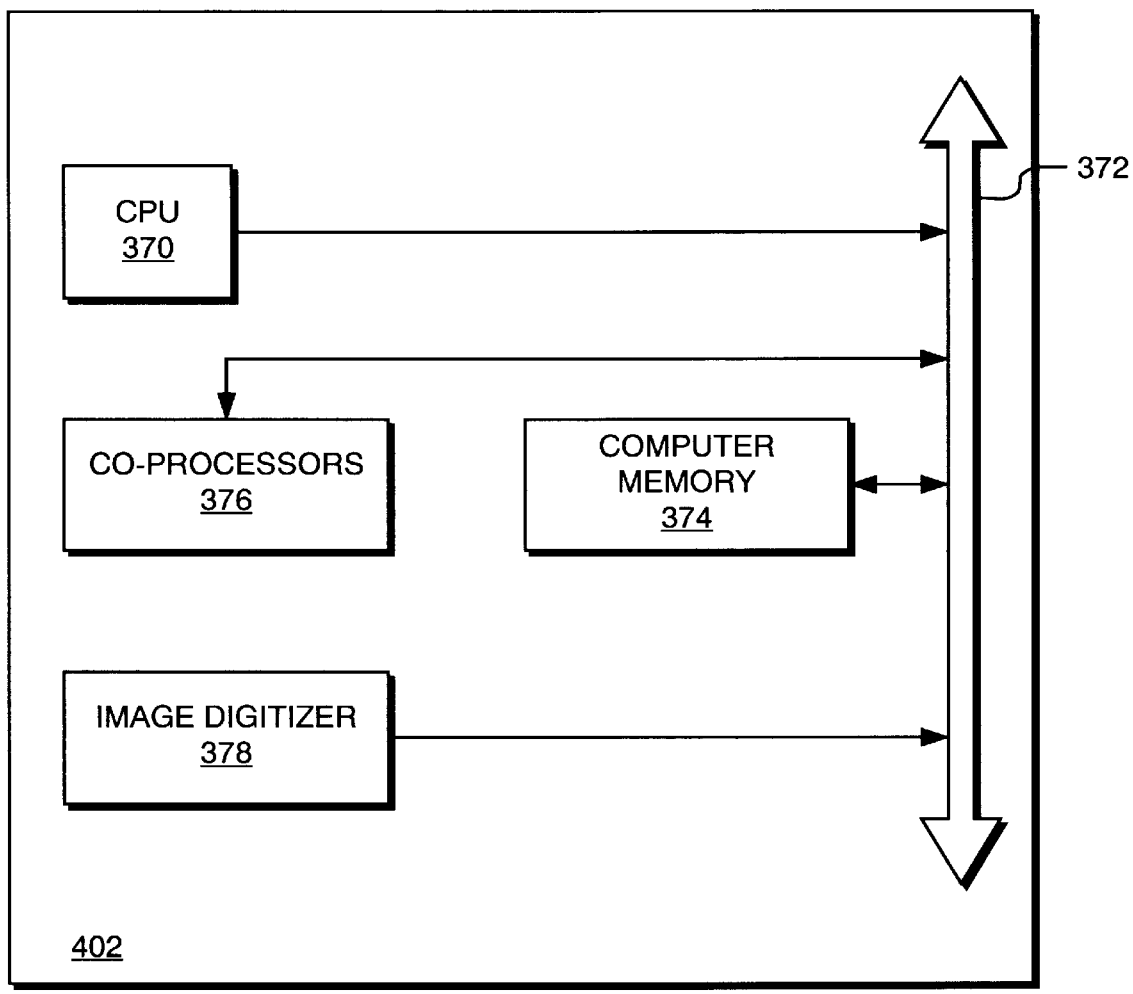
FIG. 5 is a block diagram of a system which may be used to carry out the functions of the visual control and processing computer system depicted in FIG. 3.
Figure 6A:
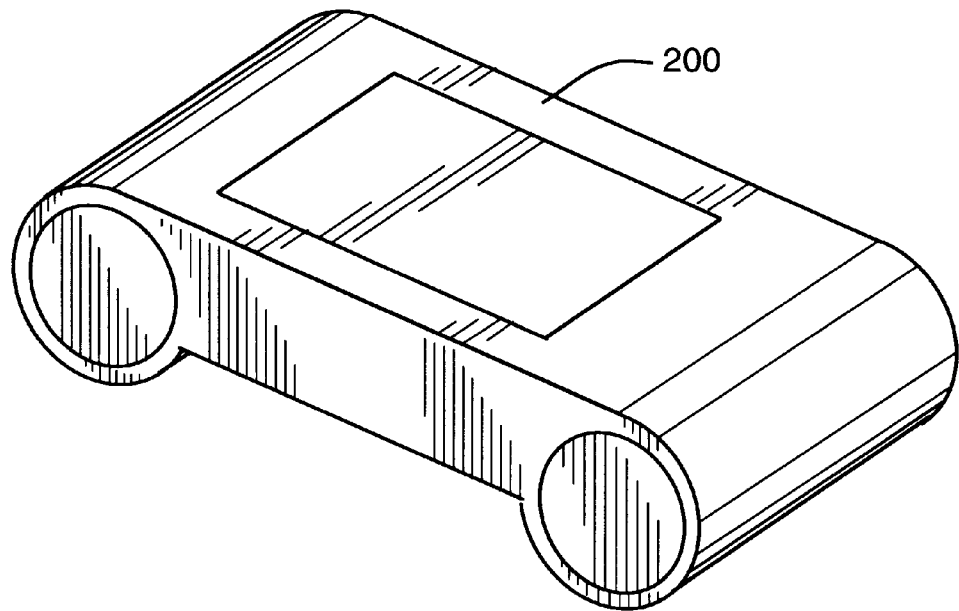
FIGS. 6A–6D each illustrate respective different types of film packages which may be identified by the illustrated embodiment of the present invention.
Figure 6B:
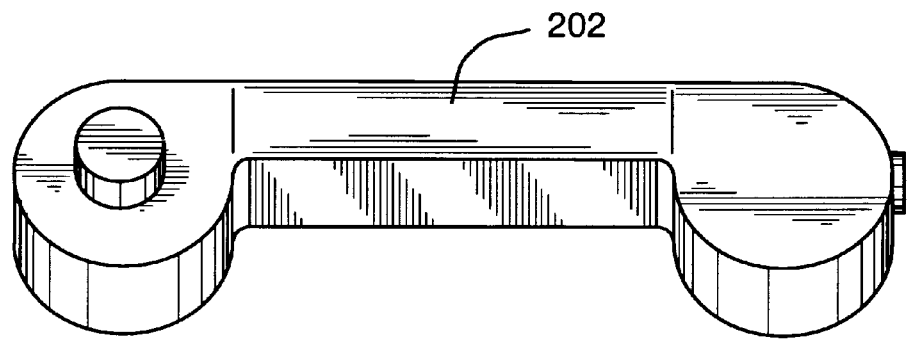
Figure 6C:
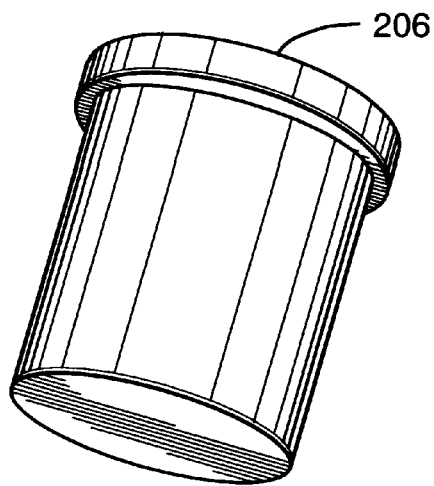
Figure 6D:
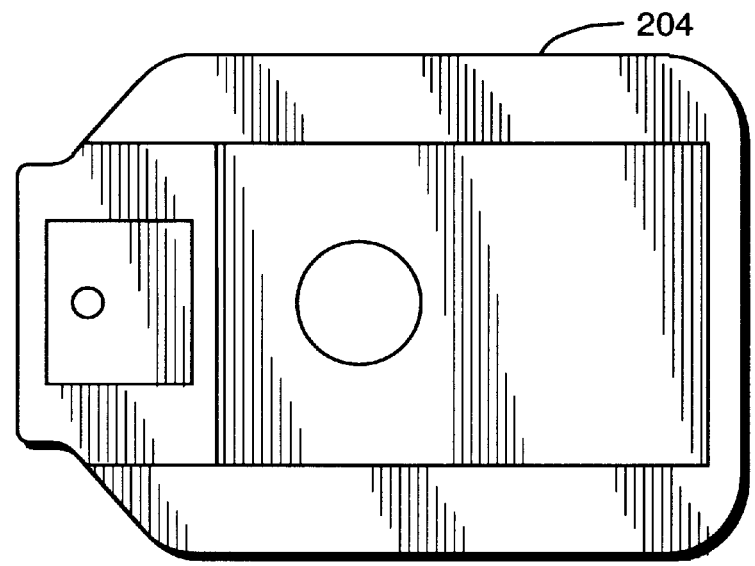

FIG. 5 is a block diagram of several devices which may be used to carry out the functions of visual control and processing computer system 402 depicted in FIG. 3. Vision control and processing computer system 402 may control the operation of conveyor 408, sensors 414a, 414b as well as the strobes and light sources of the system shown in FIG. 3. Vision control and processing computer system 402 may also control the operation of camera 418. Vision control and processing computer system 402 may also perform the various processes depicted in FIG. 4.

In order to perform some or all of these functions, vision control and processing computer system 402 may be provided with a central processing unit 370, together with a bus structure 372 and a computer memory 374. In order to increase the speed of processing, co-processors 376 may be provided. Vision control and processing computer system 402 may also comprise an image digitizer 378 for digitizing images. This additional feature can also significantly increase the speed and efficiency of the overall computer system. Other types of software-controlled general or specific purpose hardware systems may be provided to perform the functions of vision control and processing computer system 402. Hardware not requiring software control, such as logic and/or analog circuitry, may be provided as well.

By way of example, the vision control and processing computer system 402 may be implemented with a ISA bus-based vision system, such as a Cognex 5400.

While the images referred to throughout the above disclosure have been monochrome or simple digital images, they may alternatively comprise color information.

FIGS. 6A–6D show different respective types of film types, including a 126 film type 200, a 110 film type 202, a 35 mm film type 206, and a disc film type 204.

Figure 7A:
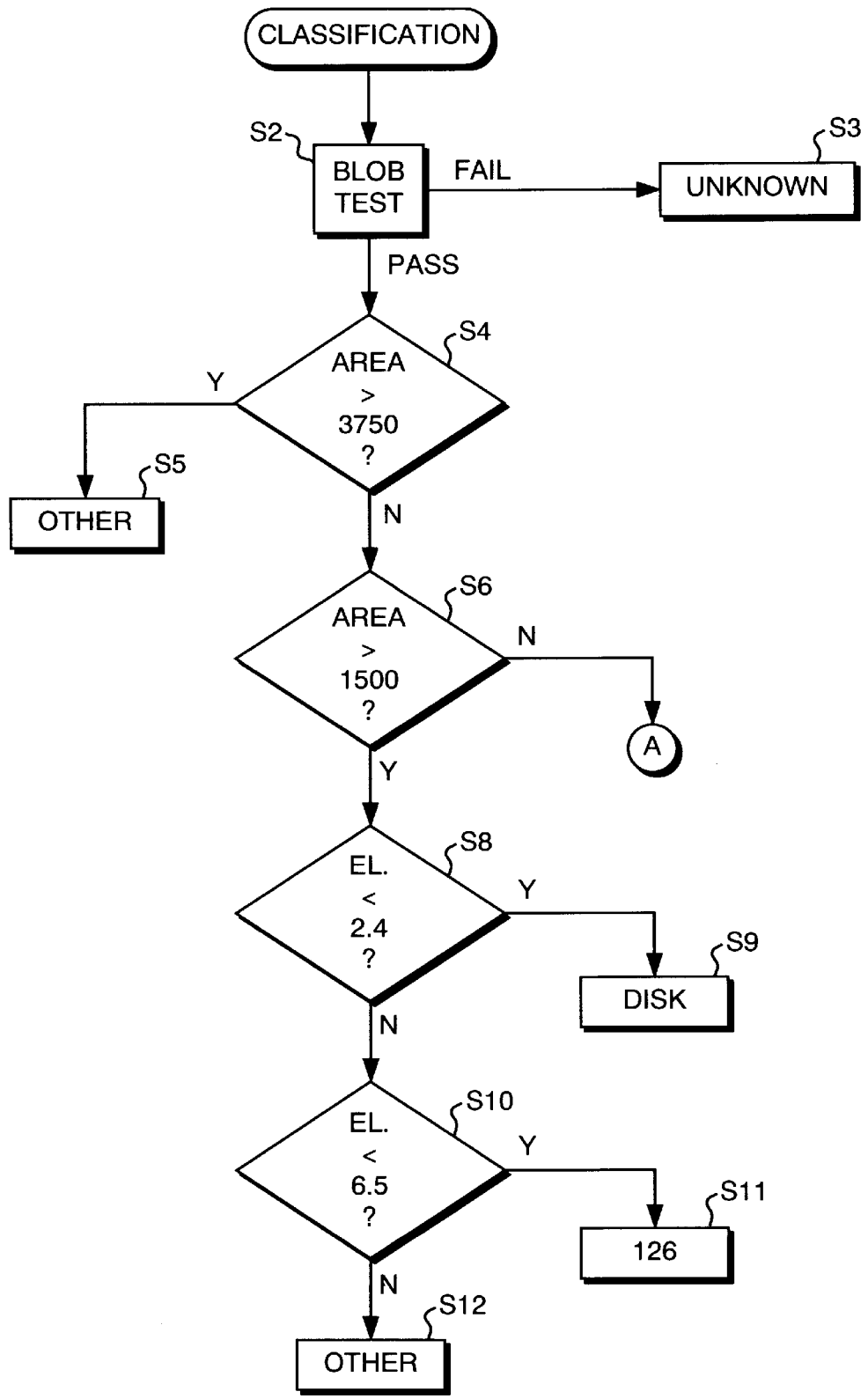
FIGS. 7A and 7B present a flow chart of a process which may be performed to classify the contents of an envelope, such process corresponding to the final step of the process illustrated in FIG. 4.
Figure 7B:
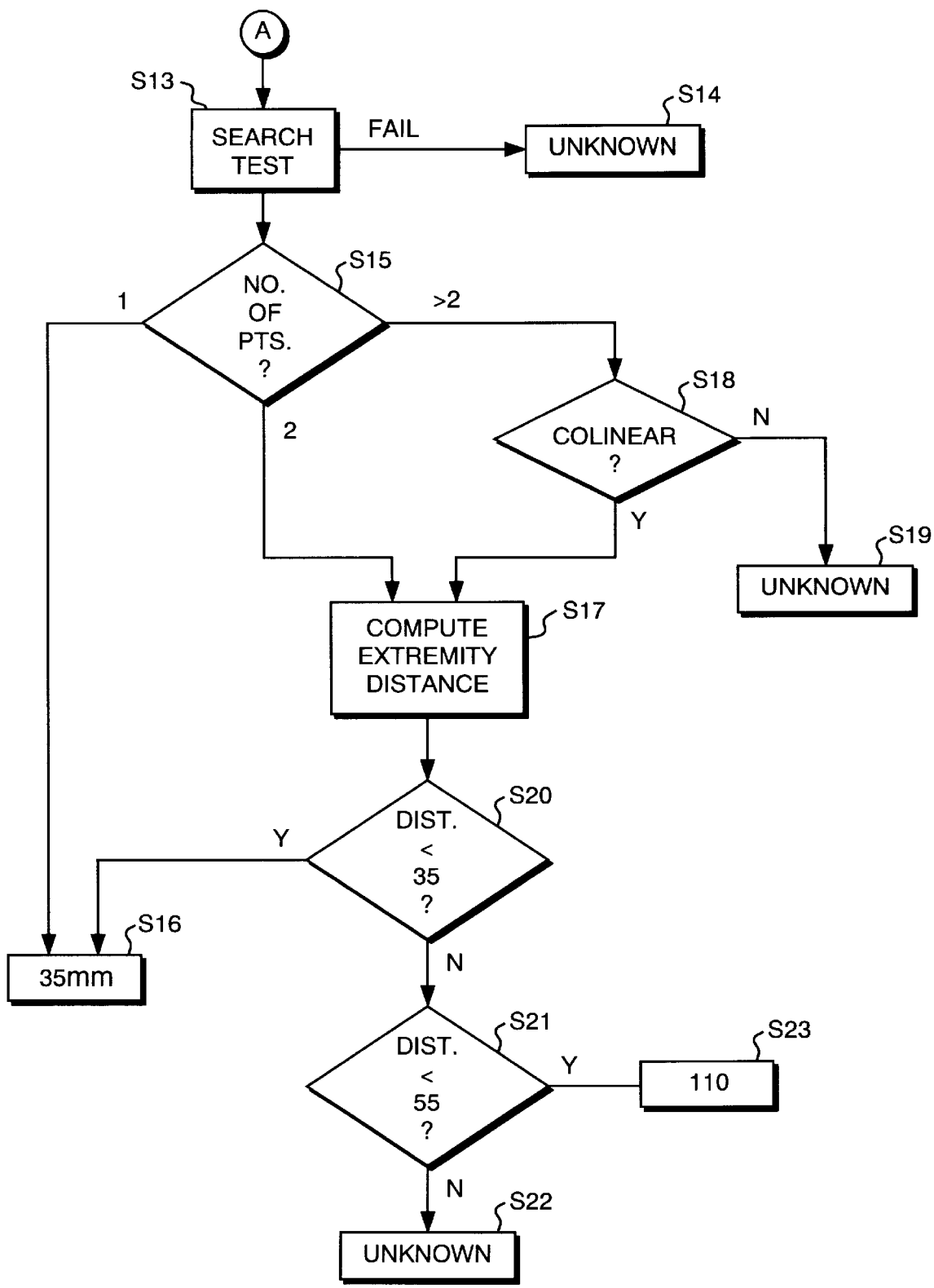

The process shown in FIG. 4 ends with interpreting the resulting binary image $g(x,y)$, in order to classify/identify the contents of the semi-opaque enclosure. FIGS. 7A–7B present a flow chart of a process that may be employed for performing that classification/identification. FIGS. 8A–8D provide graphical representations of images utilized in the process of FIGS. 7A and 7B.

As shown in FIG. 7A, upon commencing the classification process, a Blob test is performed in a first step 52. The Blob test may comprise calculating the area and elongation of the object of interest. If the process is able to perform this test, it proceeds to step S4. If not, it proceeds to step S3 and indicates that the contents of the enclosure are unknown. In this case, the envelopes in this bin could be manually sorted.

Once a successful Blob test is performed in step S2, the process proceeds to step S4, where the area of the object is compared to a threshold value (equal to 3750 pixels in the illustrated embodiment). If the area does exceed that value, the contents are designated as being in an "other" category in step S5. "Other" could be "reprints," "camera", etc.

If the area is less than the threshold value as determined in step S4, the process proceeds to step S6, where the area of the object is compared to another threshold value (equal to 1500 pixels in the illustrated embodiment) If the area does not exceed that value, the process proceeds to step S13 which is shown at the top of FIG. 7B. If the area is greater than the threshold value, the process proceeds from step S6 to step S8, where the elongation of the object is compared to an initial threshold value (equal to 2.4 pixels in the illustrated embodiment). If the elongation is less than that initial threshold value, the process proceeds to step S9, where the object is classified as a disk. If the elongation is not less than the threshold value, the process proceeds to step S10 where the elongation of the object is compared to a larger threshold value (equal to 6.5 pixels in the illustrated embodiment). If the area is less than that threshold value, the process proceeds to step S11, and the object is classified as a 126 film type. If the elongation is not within the specified range, the process proceeds to step S12, where the contents of the envelope are classified in the "other" category.

If the area of the object is less than the second smaller threshold value as determined in step S6, a Search test will be performed at step S13, which is shown at the top of FIG. 7B. If the Search test fails, the process will proceed to step S14, and the contents of the envelope will be labelled as "unknown". On the other hand, if the Search test is successful, the process proceeds to step S15.

In performing the Search test described at step S13, a normalized correlation process is performed, which may be performed using a standard Cognex Search tool. During performance of that process, a template image (model) is compared to a target image. When there is a match between the template image and the target image, the search tool identifies the match with what is called a "response".

Figure 8A:
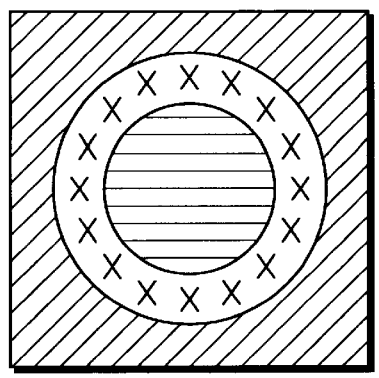
FIG. 8A is a graphical two-dimensional representation of a template image which may be used in performing normalized correlation.

FIG. 8A shows is a graphical representation of an exemplary template image 210, which may be used for purposes of performing normalized correlation as described above.

In the illustrated representation of the template image 210, foreground pixels are represented by horizontal lines, background pixels are represented by diagonal lines, and, "don't care" pixels are represented by Xs. The foreground pixels may comprise 1's and the background pixels may comprise 0's.

The normalized correlation process is preferably set so that it has an accept score or an accept threshold which is low, since an exact match is not necessary between the target image and the template image.

Figure 8B:
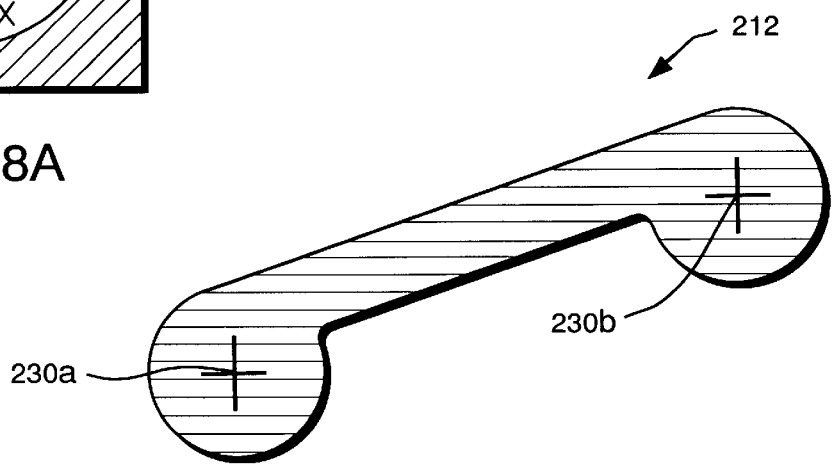
FIGS. 8B–8D are graphical two-dimensional representations of target images being compared to the template image shown in FIG. 8A.
Figure 8C:
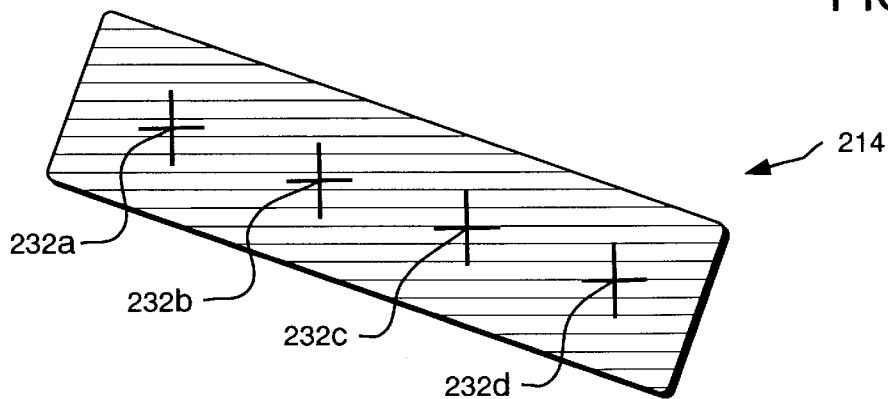
Figure 8D:
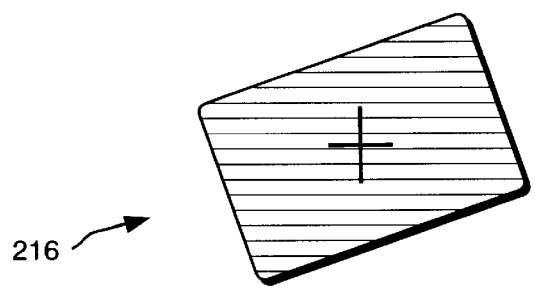

FIGS. 8B–8D show graphical representations of three different target images. Specifically, FIG. 8B illustrates a target image of a side view 212 of a 110-type film package; FIG. 8C provides a straight-on view 214 of a 110-type film package; and FIG. 8D illustrates a target image 216 of a 35 mm film package.

The target image 212 shown in FIG. 8B has two "responses" 230a, 230b, corresponding to its two "circular" end portions.

Template image 214 includes more than two (specifically, four) "responses" 232a–232d. The 35 mm template image 216 includes only one "response" in the embodiment illustrated in FIG. 8D). Using the model 210 shown in FIG. 8A, a Search test may result in 1 or 2 responses being indicated for a target image of a 35 mm package 216.

Accordingly, in view of the above, an initial determination is made at step S15 as to the number of points (responses) corresponding to a particular target image. If the number of points/responses is "1", the process proceeds to step S16, where the contents of the envelope are classified as being 35 mm film.

If the process determines at step S15 that the template image contains two responses/points, the process proceeds to step S17. If more than two points/responses are detected, the process proceeds to step S18. In step S18, a test is performed to determine if each of the points/responses within a template image are substantially co-linear with each other. If they are not, the process proceeds to step S19, where the items enclosed in the enclosure are classified as "unknown".

If the points within a target image are deemed colinear in step S18, the process proceeds to step S17.

In step S17, the process calculates the distance between the extremities of the target image. If the distance between extremities is less than a certain first lower threshold value (35 pixels in the illustrated embodiment), the process proceeds to step S16, where the contents are classified as being 35 mm film. If the distance between the extremities is not less than the initial threshold value, the process proceeds from step S20 to step S21. In step S21, the distance between the extremities is compared to a second threshold value. If the distance is less than that threshold value, the process proceeds to step S23, where the contents of the envelope are classified as being a 110-type film package. If the distance between the extremities is not less than the second threshold value, the process proceeds to step S22, where the contents are classified as "unknown".

The various specific values provided in the flow charts of FIGS. 7A and 7B are not rigid. The are only exemplary, and depend on the parameters used in a specific implementation, such as the field of view.

By way of example, a specific computer written to perform the above-described classification process is provided in Appendix A attached hereto. The content of the source code provided in Appendix A is hereby incorporated by reference herein in its entirety.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular means, materials, and embodiments, it is understood that the invention is not limited to the particulars disclosed. The invention extends to all equivalent structures, means, and uses which are within the scope of the appended claims.

APPENDIX A mac.prn

```
1    /*
2    *
3    * Copyright © November 1995
4    * Cognex Corporation, 1 Vision Dr., Natick, MA 01760-2059
5    * (508 650–3000
6    *
7    * Source: mac.v
8    Revision: 1.0
9    * Author: Sanjay Nichani
10   *
11   * History:
12   *      XX/XX/95   Sanjay Nichani      Initial Code
```

APPENDIX A-continued mac.prn

```
13   */
14   #ifndef DIST
15   #define DIST(x1,y1,x2,y2) sqrt( (double) ((x2-x1)*(x2-x1)+(y2-y1)*(y2-y1)))
16   #endif
17   /* Variable for debug    */
18   unsigned char deb=0;
19   /* Debug Flags   */
20   #define PRINT_FLAG         0x01
21   #define GRAPHIC_FLAG       0x02
22   #define TIMER_FLAG         0x04
23   #define CHP_FLAG           0x08
24   /* Debug Commands   */
25   #define DISABLE_DEBUG      (deb = 0x00)
26   #define ENABLE_DEBUG       (deb = 0xFF)
27   #define ENABLE_PRINTF      (deb != PRINT_FLAG)
28   #define ENABLE_GRAPHICS    (deb != GRAPHIC_FLAG)
29   #define ENABLE_TIMERS      (deb |= TIMER_FLAG)
30   #define ENABLE_CHP         (deb != CHP_FLAG)
31   #define DISABLE_PRINTF     (deb &= ~PRINT_FLAG)
32   #define DISABLE_GRAPHICS   (deb &= -GRAPHIC_FLAG)
33   #define DISABLE_TIMERS     (deb &= -TIMER_FLAG)
34   #define DISABLE_CHP        (deb &= ~CHP_FLAG)
35   /* Spatial Sampling Factor */
36   int sample=4;
37   #define SET_SAMPLE(n) (sample=n;)
38   /* Sets Delta */
39   int delta=15;
40   #define SET_DELTA(n) (delta=n/(double)sample+0.5);
41   /* Sets the Gain for the back acquisition */
42   #define SET_GAIN(n) (buf[1].gain=n)
43   /* Calibration Cal=0 for disable, 1 for learn caliper, 2 for run caliper */
44   /* Procedure: First Set cal_mode to 1 in which case you just acquire two
45   images, this is to train the two calipoers. Train by calling ICAL(0) for
46   image 0 and ICAL(1) for image 1, next set cal_mode to 2 and monitor
47   delta values printed. Next DISABLE_CAL and SET_DELTA(n) */
48   int cal_mode=0;         /* Flag to Enable calibration mode */
49   #define RUN_CAL            (cal_mode=2);
50   #define LEARN_CAL          (cal_mode=1)
51   #define DISABLE_CAL        (cal_mode=0)
52   /* Macros for Registration Calipers, n=0 for front, =1 for back */
53   #define ICAL(n) (caq_image_select(n);train_cal(n);}
54   /* Initialize Blob */
55   #define IB init_blob( );
56   #define IM (mod=create_disk(11, 20); }
57   #define INIT_SYS (IT(1); IB; SET_DELTA(61); IM )
58   /* Sets the threshold for the inspection, remember threshold is a double */
59   /* thresh = 3.0 for blue, 2.5 for yellow and 1.0 for red */
60   #ifdef STAND_ALONE
61   double thresh;
62   #define SET_THRESH(n) (thresh = n; IB;)
63   #else
64   #define SET_THRESH(n) (curr_env—>thresh = n; IB;)
65   #endif
66   /* Error Threshold for dist_error */
67   double dist_err=25.0;
68   #define SET_DERR(n) (dist_err=n)
69   /* Set the Border Width */
70   int border=15;
71   #define SET_BORD(n) (border = n)
72   /* Macros for acquistion */
73   #ifndef IT
74   #define IT init_trigger( );
75   #endif
76   #ifndef RT
77   #define RT run_trigger( );
78   #endif
79   #ifndef FT
80   #define FT free_trigger( );
81   #endif
82   #define RBF ( cip_set(cag_gplane, 0); my_main(0,0,0,0); )
83   #define RBD ( cip_set(Cag_gplane, 0); my_main(0,0,1,0); )
84   #ifndef ODB
85   #define ODB       (f_db_open("blew", "r");)
86   #endif
87   #ifndef CDB
88   #define CDB               f_db_close( );
89   #endif
```

APPENDIX A-continued mac.prn

```
90  #ifndef REF
91  #define REF              { ODB; f_db_get( ); CDB }
92  #endif
93  #ifndef LOOP
94  #define LOOP             { while(1) { R; button(0,0,0); }; }
95  #endif
```

APPENDIX A blob.prn

```
1   /*
2    *
3    * Copyright © November 1995
4    * Cognex Corporation, 1 Vision Dr, Natick, MA 01760-2059
5    * (508 650-3000
6    *
7    * Source: blob.v
8    * Revision: 1.0
9    * Author: Sanjay Nichani
10   *
11   * History
12   *       XX/XX/95 Sanjay Nichani     Initial Code
13   */
14  #define MAX_CLASSES 5
15  char *class[MAX_CLASSES] = { "110", "126", "35", "Disc", "Other"};
16  cse_model *mod=0;                  /* Disk Model           */
17  int hist1[256], hist2[256];        /* Histograms           */
18  cip_stats_params stat_params;      /* Statistical parameters */
19  cblob_params bp;                   /* Blob Parameters      */
20  cblob_results *blob_res=0;         /* Blob Results         */
21  cmap_params dmap;                  /* Various Maps         */
22  unsigned char map[256], arr[256], mymap[256];
23  int find_disk( );
24  double get_info( );
25  /*************************************************************
26   * Name:                 init_blob
27   *
28   * Prototype:
29   *
30   * Description:          Initialize blob
31   *
32   * Parameters
33   * None
34   *
35   * Returns:
36   * None
37   *
38   * Notes:
39   * None
40   *
41   *************************************************************/
42  void init_blob( )
43  {
44      int i;
45      /* Blob Parameters */
46
47      bp.wf = cblob_relative;        /* use a relative map                       */
48      bp.mp.re.left_n = 50;          /* for the left tail we discard the         */
49      bp.mp.re.left_p = 5;           /* smaller of 5% or 100 of the pixels       */
50      bp.mp.re.right_n = 50;         /* same for the right tail                  */
51      bp.mp.re.right_p = 5;
52      bp.mp.re.zero = 0;             /* the zero value is 40% between the tails */
53      bp.mp.re.one = 1;              /* the one value is 60% between the tails  */
54      bp.results = 2;
55      bp.min_area = 50;
56      bp.xmin = 3;                   /* discard 3 units of weight when           */
57      bp.xmax = 3;                   /* computing the blob extreme.              */
58      bp.ymin = 3;
59      bp.ymax = 3;
60  bp.flags = cblob_perim_flag;
61  /* Stat Parameters for normalization */
62
63      stat_params.stats_flags = CIP_STATS_LEFT_TAIL | CIP_STATS_RIGHT_TAIL;
```

APPENDIX A-continued blob.prn

```
64      stat_params.left_p = 5;
65      stat_params.right_p = 5;
66      /* If positive keep if negative eliminate */
67
68      for(i=0; i<256; ++i)
69      {
70      if (i > 127)
71          map[i] = 0;
72        else
73          map[i] = i;
74      }
75      /* Generate a map which when applied to img2 will be a threshold image */
76
77      dmap.mp.ar.p = (char *) arr;
78      dmap.wf = cmap_arbitrary;
79
80      for(i=0; i<256; ++i)
81      {
82  #ifdef STAND_ALONE
83        arr[i] = i*i*thresh/1000;
84  #else
85        arr[i] = i*i*curr_env—>thresh/1000;
86  #endif
87
88        if (arr[i] > 127)
89            arr[i] = 127;
90      }
91      /* for Search */
92      for(i=0; i<256; ++i)
93      {
94        if ( i && (i > 127) }
95          mymap[i] = 0;
96        else
97          mympa[i] = 255;
98      }
99      }
100 /***************************************************************************
101  * Name:                  run_blob
102  *
103  * Prototype:
104  *
105  * Description:           Run the blob analysis routines
106  *
107  * Parameters:
108  * None
109  *
110  * Returns:
111  * None
112  *
113  * Notes:
114  * None
115  *
116 ****************************************************************************
117 int run_blob(src)
118 cip_buffer *src
119 {
120     int i, ind;
121     int xoff = cag_image—>width/2, yoff = cag_image—>height/2, xx, yy;
122     double el;
123
124     ind = -1;
125
126     blob_res = cblob_connectivity(cblob_two, src, &bp, 0, 0);
127
128     for(i=0; i<bp.results; ++i)
129     {
130       if ( blob_res[i].id )
131       {
132         if ( ( deb & PRINT_FLAG) && (blob_res[i].pmi1) )
133         {
134           printf("area %3.1f el %3.1fzn?,
135             blob_res[i].area,
136             blob_res[i].pmi2/blob_res[i].pmi1);
137         }
138         if (deb & GRAPHIC_FLAG)
139         {
140           cgr_box(cag_gplane,
```

APPENDIX A-continued blob.prn

```
141                (int) (xoff + blob_res[i].xmin),
142                (int) (yoff + blob_res[i].ymin),
143                (int) (xoff + blob_res[i].xmax),
144                (int) (yoff + blob_res[i].ymax), CAQ_RED);
145            }
146        }
147        else
148            break;
149    }
150    /* Classification Logic */
151    if (i > 0)
152    {
153        if (blob_res[0].area > 3750.0)
154        {
155            ind = 4;
156        }
157        else
158        if (blob_res[0].area > 1500.0)
159        {
160            el = blob_res[0].pmi2/blob_res[0].pmi1;
161
162            if (el < 2.4
163                ind = 3;
164            else
165            if (el < 6.5)
166                ind = 1;
167            else
168                ind = 4;
169        }
170    }
171
172    return ind;
173 }
174 /****************************************************************************
175  * Name:                   run_arch
176  *
177  * Prototype:
178  *
179  * Description:            Run the Search Strategy
180  *
181  * Parameters:
182  * None
183  *
184  * Returns:
185  * None
186  *
187  * Notes:
188  * None
189  *
190  ****************************************************************************/
191 int run_arch(src)
192 cip_buffer *src;
193 {
194     cip_buffer *view=0;
195     int i, j, ind, n:
196     double val;
197     int x1, y1, x2, y2;
198     int sx[12], sy[12];
199
200     cct_signal sig;
201     /* Error Handling */
202
203     if (sig = cct_catch(0))
204     {
205         if (view)
206         {
207             cip_delete(view);
208             view = 0;
209         }
210
211         cct_throw(sig);
212     }
213
214     Ind = -1;
215     val = 0.0;
216     n = 0;
217     for (i3'0; i<2; ++i)
```

APPENDIX A-continued blob.prn

```
218     {
219       if (blob_res[i].id)
220       {
221         x1 = blob_res[i].xmin;
222         y1 = blob_res[i].ymin;
223         x2 = blob_res[i].xmax;
224         y2 = blob_res[i].ymax;
225
226         view = cip_window(src, 0, x1, y1, x2-x1+1, y2-y1+1);
227
228         /* Look for disk */
229
230         if (mod)
231         {
232           n += find_disk(view, mod, x1, y1, &sx[n], &sy[n]);
233         }
234         cip_delete(view);
235         view = 0;
236
237       }
238       else
239         break;
240     }
241     val = get_info(sx, sy, n);
242     if (deb & PRINT_FLAG)
243     {
244       printf("val %3.1f n %dzn", val, n);
245     }
246
247     /* Classification Logic */
248     if (i > 0)
249     {
250       if ( (val > 34) && (val < 55) )
251         ind = 0
252       else
253       if ( ( (val > 0.0) && (val <= 34) ) | (val == -1.0) )
254       {
255         ind = 2;
256       }
257     }
258     return ind;
259 }
260 /***************************************************************************
261  * Name:               my_main
262  *
263  * Prototype:
264  *
265  * Description:        The main routine for envelope content identification
266  *
267  * Parameters:         flag = 0 for forzen, 1 for database, 2 for triggered
268  * None
269  *
270  * Returns
271  * None
272  *
273  * Notes:
274  * None
275  *
276  ***************************************************************************/
277 int my_main(src1, src2, flag, err)
278 cip_buffer *src1, *src2;
279 int flag, *err;
280 {
281   cip_buffer *src=0, *win=0, *wimg[4] = (0, 0, 0, 0);
282   cip_buffer *img1=0, *img2=0, *view=0;
283   int i, ms, total=0, ind;
284   cip_stats_results *stat1, *stat2, *stat_res
285   cmap_params *cmap;
286   ctm_timer t;
287   char str[12];
288   cct_signal sig;
289
290   /* Error Handling */
291
292   if (sig = cct_catch(0))
293   {
294     if (src)
```

APPENDIX A-continued blob.prn

```
295         {
296            cip_delete(src);
297            src = 0;
298         }
299
300         if (win)
301         {
302            cip_delete(win);
303            win = 0:
304         }
305
306         if (view)
307         {
308            cip_delete(view);
309            view = 0;
310         }
311
312         if (img1)
313         {
314            cip_delete(img1);
315            img1 = 0;
316         }
317
318         if (img2)
319         {
320            cip_delete(img2);
321            img2 = 0;
322         }
323         if ( (flag < 2) && (src2) )
324         {
325            cip_delete(src1);
326            src1 = 0;
327         }
328         if ( (flag < 2) && (src2) )
329         {
330            cip_delete(src2);
331            src2 = 0;
332         }
333         for(i=0; i<4; ++i)
334            if (wimg[i])
335            {
336               cipo_delete(wimg[i]);
337               wimg[i] = 0:
338            }
339         if (blob_res)
340         {
341            free(blob_res):
342            blob_res = 0;
343         }
344         if (cmap—>mp.ar.p]
345         {
346            free(cmap—>mp.ar.p);
347            cmap—>mp.ar.p = 0;
348         }
349         if (cmap)
350         {
351            free(cmap);
352            cmap = 0;
353         }
354         if (stat1)
355         {
356            free(stat1);
357            stat1 = 0;
358         }
359         if (stat2)
360         {
361            free(stat2);
362            stat2 = 0;
363         }
364     #ifndef STAND_ALONE
365         if (sig == EXPIRED)
366            cct_throw(sig);
367         else
368     #endif
369         if (err)
370            *err = INS2_ERR;
371
```

APPENDIX A-continued blob.prn

```
372        return -1;
373      }
374
375      if (deb & CHP_FLAG)
376        chp_stats( );
377
378      /* Get from database or Frozen image or Acquired Images */
379      switch(flag)
380      {
381        /* This option runs on a frozen sub sampled display image */
382
383        case 0:
384
385          win = cip_window(caq_image, 0, 0, 0,
386              caq_image—>width/sample, caq_image —>height/sample);
387          src1 '2 cip_copy(win, 0);
388          cip_delete(win);
389
390            win = cip_window(caq_image, 0, caq_imager—>width/2, 0,
391                caq_image—>width/sample, caq_image—>height/sample);
392          src2 = cip_copy(win, 0);
393          cip_delete(win);
394
395          break
396        /* This opotion runs on the database version of above */
397
398        case 1:
399
400          f_db_get( );
401        cip_set(caq_gplane, 0);
402
403        win = cip_window(caq_image, 0, 0, 0,
404            caq_image—>width/sample, caq_image—>height/sample);
405        win = cip_copy(win, 0);
406        cip_delete(win);
407
408        win = cip_window(caq_image, 0, caq_image—>width/2, 0,
409            caq_image—>width/sample, caq_image—>height/sample);
410        src2 = cip_copy(win, 0);
411        cip_delete(win);
412
413        break;
414      /* New acquire so src1 and src2 are passed in */
415
416        default:
417
418          break;
419      }
420      /* Window to get appopriate areas based on delta and border */
421      img1 = cip_window(src1, 0, border, 0, src1—>width-delta-2*border,
422            src1—>height-2*0);
423      img2 = cip_window(src21, 0, delta+border, 0,
424            src2—>width-delta-2*border, src2—>height-2*0);
425
426      if (deb & TIMER_FLAG)
427      {
428        ctm_begin(&t);
429        total = 28;         /* The 28 ms for Sampling */
430      }
431      /* Compute the Statistics of the two images */
432
433      stat1 = cip_stats(src1, NULL, &stat_params, NULL, hist1);
434      stat2 = cip_state(src2, NULL, &stat_params, NULL, hist2);
435      /* Compute a Normalization map */
436
437      cmap = cip_dist_match(stat1, stat2, hist1, hist2, CIP_NORM_TAIL, 0);
438      if (deb & TIMER_FALG)
439      {
440        ms = ctm_read(&t);
441        printf("Statistics: %dzn", ms);
442        total += ms;
443        ctm_begin(&t);
444      }
445
446      /* Normalize and Subtract */
447
448      src = cip_arith(img2, img1, 0, cmap, CIP_ARITH_SUB1, 1);
```

APPENDIX A-continued blob.prn

```
449       /* Keep ony the positive values */
450
451       cip_pixel_map(src, src, map);
452       if (deb & TIMER_FLAG)
453       {
454         ms = ctm_read(&t);
455         printf("Difference Image: &dzn", ms);
456         total += ms;
457         ctm_begin(&t);
458       }
459
460       /* Subtract again to see which pixels exceed the threshold */
461       win = cip_arith(src, img2, 0, &dmap, CIP_ARITH_SUB2, 0);
462       cip_pixel_map(win, win, mymap);
463
464       if (deb & TIMER_FLAG)
465       {
466         ms = ctm_read(&t);
467         printf("Binary Image: %dzn", ms);
468         total += ms;
469         ctm_begin(&t);
470       }
471  #ifndef STAND_ALONE
472       CHECK_TIME_OUT:
473  #endif
474
475       /* Run Blob */
476       ind = run_blob(win, 1);
477       if (deb & TIMER_FLAG)
478       {
479         ms = ctm_read(&t);
480         printf("Blob: &dzn", ms);
481         total += ms;
482         ctm_begin(&t);
483       }
484
485  #ifndef STAND_ALONE
486       CHECK_TIME_OUT;
487  #endif
488
489       /* Run Search */
490       if (ind == -1)
491         ind = run_srch(win);
492       if (deb & TIMER_FLAG)
493       {
494         ms = ctm_read(&t);
495         printf("SrcH: &dzn", ms);
496         total += ms;
497       }
498
499       if (deb & PRINT_FLAG)
500       {
501         if (ind == -1)
502         {
503           strcpy(str, "UFO");
504         {
505         else
506             strcpy(str, class[ind]);
507
508         printf("Film -- : %s Time -- : %3d zn", str, total);
509       }
510
511       if (deb & GRAPHIC_FLAG)
512       {
513         cgr_fgscreen->cursory = 400;
514         cgr_fgscreen->cursorx = 20;
515         if (ind != -1)
516           cgr_printf(cgr_fgscreen, "Film: %s Time %3d ms", class[ind], total);
517         else
518           cgr_printf(cgr_fgscreen, "UFO Time %3d ms", total);
519         /* Select Buffer */
520
521         caq_image_select(0);
522         /* Window into the four quadrants */
523
524         wimg[0] = cip_window(caq_image, 0, 0, 0,
525                   caq_image->width2, caq_image->height/2);
```

APPENDIX A-continued blob.prn

```
526        wimg[1] = cip_window(caq_image, 0, caq_image—>width/2, 0,
527               caq_image—width/2, caq_image—>height/2);
528        wimg[2] = cip_window(caq_image, 0, 0, caq_image—>height/2,
529               caq_image—>width/2, caq_image—>height/2);
530        wimg[3] = cip_window(caq_image, 0, caq_image—>width/2,
531                       caq_image—>height/2,
532             caq_image—>width/2, caq_image—>height/2);
533
534        /* Image 1 */
535
536        cip_set(wimg[0], 0);
537        cip_copy(src1, wimg[0]);
538        cgr_fgscreen—>cursory = 130;
539        cgr_fgscreen—>cursorx = 20;
540        cgr_printf(cgr_fgscreen, "Front Image");
541        /* Image 2 */
542
543        cip_set(wimg[1], 0);
544        cip_copy(src2, wimg[1]);
545        cgr_fgscreen—>cursorx = caq_image—>width/2 + 20;
546        cgr_fgscreen—>cursory = 130;
547        cgr_printf(cgr_fgscreen, "Back Image");
548        /* Difference Image */
549
550        cip_set(wimg[2], 0);
551        cip_copy(src, wimg[2]);
552        cgr_fgscreen—>cursorx = 20
553        cgr_fgscreen—>cursory = 210;
554        cgr_printf(cgr_fgscreen, "Diff Image");
555        /* Thresholded Difference Image */
556
557        cip_set(wimg[3], 0);
558        cip_copy(wimg[3];
559        cgr_fgscreen—>cursorx = caq_image—>width/2 ' 20;
560        cgr_fgscreen—>cursory = 210;
561        cgr_printf(cgr_fgscreen, "Binary Image");
562
563        free(wimg[0]);
564        free(wimg[1]);
565        free(wimg[2]);
566        free(wimg[3]);
567     }
568     /* Delete Stuff */
569
570     if (blob_res)
571     {
572        free(blob_res);
573        blob_res = 0;
574     }
575     free(cmap—>mp.ar.p);
576     cmap—>mp.ar.p = 0;
577     free(cmap);
578     cmap = 0;
579
580     free(stat1);
581     stat1 = 0;
582
583     free(stat2);
584     stat2 = 0;
585
586     cip_delete(src);
587     src = 0;
588
589     cip_delete(img1);
590     img1 = 0;
591
592     cip_delete(img2);
593     img2 = 0;
594
595     cip_delete(win);
596     win = 0;
597     /* Src1 and Src2 are deleted if they were created here */
598
599     if (flag < 2)
600     {
601        cip_delete(src1);
602        src1=0;
```

APPENDIX A-continued blob.prn

```
603
604        cip_delete(src2);
605        src2 = 0;
606      }
607      if (deb & CHP_FLAG)
608        chp_stats( );
609      if (err)
610      {
611        if (ind == -1)
612          *err = UNR2_ERR;
613        else
614          *err = OK;
615      }
616
617      return ind;
618    }
```

APPENDIX A circ.prn

```
1    /*
2     *
3     * Copyright © November 1995
4     * Cognex Corporation, 1 Vision Dr, Natick, Ma 10760-2059
5     * (508 65-3000
6     *
7     * Source: circ. v
8     * Revision: 1.0
9     * Author: Sanjay Nichani
10    *
11    * History:
12    *       XX/XX/95 Sanjay Nichani    Initial Code
13    */
14    ctr_params disk_gtp =
15      { 2                        /* (was 16) make a model with 16 grey levels */
16        0,                       /* no leniency       */
17        0,                       /* don't measure angle      */
18        10,                      /* normal bias       */
19        1,                       /* left tail at 1%       */
20        1,                       /* right tail at 1%      */
21        50,                      /* threshol,d not used for grey models */
22        1, 1,                    /* model resolution     */
23        No,                      /* don't train for reader    */
24        0,                       /* no angle training     */
25        0,                       /* ditto      */
26        0.0,                     /* no standard deviation thresholding for statistics */
27        128,                     /* care threshold for mask training     */
28                                 /* (don not bother to initialized reserved fields)    */
29      };
30    cse_params disk_nsp =
31      { cse_normalized,      /* serach and report position based on NCS.   */
32        cse_norm_binary,     /* return normalized correlation value (NCV) */
33        NO,                  /* don't measure angle      */
34        NO,                  /* Cognex use only      */
35        2,                   /* find one feature, return 1 results record */
36        250,                 /* feature found if NCV >= 500      */
37        700                  /* threshold of confusion: accept the first
38                                feature found with NCV >= 500 (not very
39                                confusing scene).      */
40      };
41    disk_nsp.pm.c = cse_pm_make;   /* C doesn't allow initializing unions, so we
42               initialize the pixel map control this way.   */
43    /****************************************************************************
44    * Name:                 is_it_inside
45    *
46    * Prototype:
47    *
48    Description:           is it inside the circle
49    *
50    * Parameters:
51    * None
52    *
53    * Returns:
```

APPENDIX A-continued circ.prn

```
54   * None
55   *
56   * Notes:
57   * None
58   *
59   ******************************************************************************
60   int is_it_inside (x, y, rad)
61   int x, y;
62   int rad;
63   {
64      double dist;
65      dist = sqrt ( (double) (x * x + y * y) );
66      if (dist <= rad)
67         return 1;
68      else
69         return 0;
70   }
71   /*****************************************************************************
72   * Name:                   create_disk
73   *
74   * Prototype:
75   *
76   * Description:            creates a circle model
77   *
78   * Parameters:
79   * None
80   *
81   * Returns:
82   * None
83   *
84   * Notes:
85   * None
86   *
87   ******************************************************************************
88   cse_model *create_disk(r, per)
89   int r, per;
90   {
91      int debug = 0;
92      int x, y;
93      int ir, or;
94      int width;
95      cip_buffer *mod;
96      cip_buffer *mask;
97      cse_model *model;
98      CIA_31_16 x0, y0p
99      ir = r - r*per/100;    /* inside percentage of radius */
100     or = r + r*per/100;    /* outside percentage of radius */
101     mod = cip_create(or*2+1, or*2+1, 8);
102     cip_set(mod, 0);
103
104     mask = cip_create(or*2+1, or*2+1, 8);
105     cip_set(mask, 255);
106     width = mask—>width
107
108     for (y = 0; y < mask—>height, y++)
109        for (x = 0; x < mask—>width, x++)
110        {
111           if (is_it_inside(x-mask—>width/2, y-mask—>height/2, or))
112           {
113              mask—>put (mask, x, y, 0);
114           }
115        }
116
117     for (y = 0; y < mask—>height; y++)
118        for (x = 0; x < mask—>width; x++)
119        {
120           if (is_it_inside(x-mask—>width/2, y-mask—>height/2, ir))
121           {
122              mask—>put (mask, x, y, 255);
123           }
124        }
125     for (y = 0; y < mod—>height y++)
126        for (x = 0; x < mod—>width; x++)
127        {
128           if (is_it_inside(x-mod—>width/2, y-mod—>height/2, r))
129           {
130              mod—>put (mod, x, y, 255);
```

APPENDIX A-continued circ.prn

```
131          }
132        }
133
134        if (debug)
135        {
136          caq_overlay( );
137          cip_copy(mask, caq_image);
138          cip_copy(mod, caq_image);
139        }
140
141        model = ctr_train_model (mod, NULL, mask, 0, 0, 0, 0, &disk_gtp, 0);
142
143        x0 = y0 = (mod—>width ) << 15;
144
145        ctr_origin (model , x0, y0);
146        cip_delete(mod); mod = NULL;
147        cip_delete(mask); mask = NULL;
148        return(model);
149      }
150 /****************************************************************************
151    * Name:          train_disk
152    *
153    * Prototype:
154    *
155    * Description:   routine for training a disk interactively
156    *
157    * Parameters:
158    * None
159    *
160    * Returns:
161    * None
162    *
163    * Notes:
164    * None
165    *
166    ****************************************************************************
167 void train_disk( )
168 {
169        CIRCLE c;
170        c.xc = 100;
171        c.yc = 100;
172        c.r. = 20;
173
174        define_circle(&c);
175        cd_showas(&c;    "CIRCLE");
176
177 }
178 /****************************************************************************
179    * Name:          is_it_a_line
180    *
181    * Prototype:
182    *
183    * Description:   is it a line
184    *
185    * Parameters:
186    * None
187    *
188    * Returns:       returns distance between extreme points if it is co, else -20
189    * None
190    *
191    * Notes:
192    * None
193    *
194    ****************************************************************************
195 double is_it_a_line(x, y, n)
196 int *x, *y, n;
197 {
198        int i, j, maxi, maxj;
199        double a, b, dist, sum, max;
200        /* Figure out the two most extreme points */
201        max = 0.0;
202
203        for(i=0, i<n-1; ++i)
204          for(j=i+1; j<n; ++j)
205          {
206            dist = DIST(x[i], y[i], x[j], y[j]);
207
```

APPENDIX A-continued circ.prn

```
208        if (dist > max)
209        {
210           max = dist;
211           maxi = i;
212           maxj = j;
213        }
214
215        dist = (double (x[i]*x[j]-y[i]*y[j])/DIST(x[i],y[i],0,0)/DIST(x[j],y[j],0,0);
216     }
217     sum = 0;
218
219     if ((x(maxj)—x[maxi]) != 0)
220     {
221        a = (double) (y[maxj]-y[maxi])/(x[maxj]-(x[maxj]-x[maxi])
222        b = -a*x[maxi]+y[maxi];
223
224        for (i=0; i<n; ++i)
225        {
226          dist = fabs(y[i]-b-a*x[i])/sqrt(a*a+1.0);
227          sum += dist;
228        }
229     }
230     else
231     {
232        for(i=0; i<n; ++i)
233        {
234          dist = abs(x[i]-x[0]);
235          sum += dist;
236        }
237     }
238     /*
239     sum = sum/(n-2);
240     */
241     /*
242     if (deb & PRINT_FLAG)
243        printf("Line Err %3.1fzn", sum);
244     */
245
246     if (sum < dist_err)
247        return max;
248     else
249        return -max;
250 }
251 /******************************************************************
252     Name:         find_disk
253     *
254     * Prototype:
255     *
256     * Description:   run time routine for finding the disk
257     *
258     * Parameters:
259     * None
260     *
261     * Returns:
262     * None
263     *
264     * Notes:
265     * None
266     *
267     ******************************************************************
268 int find_disk(view, model, xoff, yoff, x, y)
269 cip_buffer *view;
270 cse_model *model;
271 int xoff, yoff, *x, *y;
272 {
273     cip_buffer *src=0, *win=0:
274     int   b, i, j;
275     int   minj, maxj, min, max;
276     cse_rseults r[6];
277     cse_results *rp;
278     cct_signal sig;
279     /* Error Handling */
280
281     if (sig = cct_catch(0))
282     *
283        if (src)
284        {
```

APPENDIX A-continued circ.prn

```
285         cip_delete(src);
286         src = 0;
287       }
288
289       if (win)
290       {
291       cip_delete(win);
292       win = 0;
293       }
294
295       cct_throw(sig);
296     }
297
298     disk_nsp.timeout = 90;
299
300     if ( (view—>width < 30) || (view—>height < 30) )
301        b = 25;
302     else
303        b = 15
304
305     src = cip_create(view—>width+2*b, view—>height+2*b, 8);
306     cip_set(src, 0);
307     win = cip_window(src, 0, b, b, view—>width, view—>height);
308     cip_copy(view, win);
309     disk_nsp.results = 6;
310     disk_nsp.accept = 200;
311     cse_area_search(src, model, &disk_nsp, r);
312     for(i=0; i<disk_nsp.result; ++i)
313     {
314        rp = &r[i]
315        if (rp—>found)
316        {
317          x[i] = caq_image—>width/2 + rp—>x.p.i + delta + xoff − b + border;
318          y[i] = rp—>y.p.i + yoff − b + 0;
319
320          /*
321          if (deb & Print_FLAG)
322             printf("Disk 2 &d Score *dzn", i, rp—>score);
323          */
324          if (deb & GRAPHIC_FLAG)
325             cgr_cross(caq_gplane,x[i],y[i], 3, 3,CAQ_RED);
326        }
327        else
328           break;
329     }
330     cip_delete(win);
331     win = 0;
332
333     cip_delete(src);
334     src = 0;
335
336     return i;
337 }
338 /***************************************************************************
339  * Name:       get_inf0
340  *
341  * Prototype:
342  *
343  * Description:   x, y, n
344  *
345  * Parameters:
346  * None
347  *
348  * Returns:
349  * None
350  *
351  * Notes:
352  * None
353  *
354  ***************************************************************************
355 double get_info(x, y, n)
356 int *x, *y, np
357 {
358    double col;
359
360    switch (n)
361    {
```

APPENDIX A-continued circ.prn

```
362       case 0:
363          return 0;
364
365       case 1:
366          return -1;
367
368       case 2:
369          return DIST(x[0], y[0], x[1], y[1]);
370
371       default:
372          /* Check for Collinearity */
373          /* Returns distance between extreme points if collinear, else
374             returns -2 */
375          col = is_it_a_line(x, y, n);
376          return col;
377    }
378 }
379
```

What is claimed is:

1. A method for classifying an object of unknown shape, configuration, and location within a non-rigid semi-opaque enclosure having at least first and second external surfaces, said first external surface having a pattern visible externally to said enclosure, said method comprising:

capturing a first digital image from first channel light reflected off said first external surface of said semi-opaque enclosure;

capturing a second digital image from second channel light navigating said object inside said enclosure and emanating from said first external surface of said enclosure;

forming a difference image substantially devoid of information representing said visible pattern by subtracting one of said first and second digital images from the other; and processing said difference image to classify said object as one of a plurality of types of objects within a set of known types of objects.

2. The method according to claim 1, wherein said semi-opaque enclosure comprises an envelope.

3. The method according to claim 2, comprising generating said first channel light with front lighting.

4. The method according to claim 2, comprising generating said first channel light by directing first light from a location external said enclosure toward said first external surface, said first light being generally orthogonal to said first external surface.

5. The method according to claim 3, comprising generating said second channel light with back lighting.

6. The method according to claim 4, comprising generating said second channel light by directing second light from a location external said enclosure toward said second external surface, said second light being generally orthogonal to said second external surface.

7. The method according to claim 2, comprising generating said second channel light with back lighting.

8. The method according to claim 2, comprising generating said second channel light by directing second light from a location external said enclosure toward said second external surface, said second light being generally orthogonal to said second external surface.

9. The method according to claim 2, wherein said step of forming a difference image comprises subtracting said second digital image from said first digital image.

10. The method according to claim 2, wherein said first and second digital images comprise two-dimensional gray level images represented with respective two-dimensional light intensity functions $f_1(x,y)$ and $f_2(x,y)$, wherein x and y denote spatial coordinates and $f_1$ and $f_2$ are values proportional to the gray level of the respective image at a point x,y.

11. The method according to claim 10, said difference image comprising a two-dimensional gray level image, said method further comprising performing a resegmentation operation on said difference image, said resegmentation operation comprising forming a two-dimensional binary image from said difference image.

12. The method according to claim 11, wherein said step of processing said difference image comprises classifying said object by performing Blob and Search processing steps.

13. The method according to claim 11, said step of forming a two-dimensional binary image from said difference image comprising performing a thresholding operation on said difference image $d(x,y)$, said thresholding operation comprising forming a two-dimensional binary thresholded image $g(x,y)$ in accordance with the following:

$$g(x, y) = \begin{array}{l} 1 \text{ if } d(x, y) > p(x, y) \\ 0 \text{ if } d(x, y) \leq p(x, y), \end{array}$$

where x and y are spatial coordinates of a point (x,y) of said difference image, $d(x,y)$ is the gray level of said point (x,y), and $p(x,y)$ is a local threshold control variable corresponding to said point (x,y).

14. The method according to claim 8, wherein $p(x,y)$ represents a gray level local threshold image defined as a function of at least one of said first and second digital images $f_1(x,y)$ and $f_2(x,y)$.

15. The method according to claim 14, wherein $p(x,y)$ is obtained by performing a local threshold mapping operation on said second digital image $f_2(x,y)$, said local threshold mapping operation comprising performing point processing in the spatial domain on said second digital image $f_2(x,y)$ in accordance with r=dmap(s), for a pixel having spatial coordinates (x,y) where dmap is a mapping function, r is a gray level equal to $p(x,y)$, and s is a gray level equal to $f_2(x,y)$.

16. The method according to claim 15, wherein the slope of r(s) continuously increases as the value of s increases.

17. The method according to claim 16, wherein $r=s^2t/1000$, where t is a threshold coefficient determined empirically.

18. A system for classifying an object of unknown shape, configuration, and location within a malleable semi-opaque enclosure having at least first and second external surfaces, said first external surface having a pattern visible externally to said enclosure, said system comprising:

a first image acquisition subsystem for capturing a first digital image from first channel light reflected off said first external surface of said semi-opaque enclosure;

a second image acquisition subsystem for capturing a second digital image from second channel light navigating said object inside said enclosure and emanating from said first external surface of said enclosure;

means for forming a difference image substantially devoid of information representing said visible pattern by subtracting one of said first and second digital images from the other; and means for processing said difference image to classify said object as one of a plurality of types of objects within a set of known types of objects.

19. The system according to claim 18, wherein said semi-opaque enclosure comprises an envelope.

20. The system according to claim 19, wherein said first image acquisition subsystem comprises a front light for generating said first channel light.

21. The system according to claim 19, wherein said first image acquisition subsystem comprises a first light directed from a location external said enclosure toward said first external surface, said first light directing light in a direction generally orthogonal to said first external surface.

22. The system according to claim 20, wherein said second image acquisition subsystem comprises a back light for generating said second channel light.

23. The system according to claim 21, wherein said second image acquisition subsystem comprises a second light for generating said second channel light by directing light from a location external said enclosure toward said second external surface, said second light directing light generally orthogonal to said second external surface.

24. The system according to claim 19, comprising a vision control and processing computer system.

25. The system according to claim 24, wherein said vision control and processing computer system comprises a central processing unit, at least one co-processor, a computer memory device, and an image digitizing device.

* * * * *